United States Patent
Holland-Moritz et al.

(10) Patent No.: US 11,811,201 B2
(45) Date of Patent: Nov. 7, 2023

(54) WIRE STRIPPER

(71) Applicant: Rennsteig Werkzeuge GmbH, Steinbach-Hallenberg (DE)

(72) Inventors: Georg Holland-Moritz, Steinbach-Hallenberg (DE); Michael Brueckner, Steinbach-Hallenberg (DE); Ralf Legler, Altersbach (DE)

(73) Assignee: RENNSTEIG WERKZEUGE GMBH, Steinbach-Hallenberg (DE)

( * ) Notice: Subject to any disclaimer, the term of this patent is extended or adjusted under 35 U.S.C. 154(b) by 377 days.

(21) Appl. No.: 16/767,651

(22) PCT Filed: Nov. 8, 2018

(86) PCT No.: PCT/EP2018/080587
§ 371 (c)(1),
(2) Date: May 28, 2020

(87) PCT Pub. No.: WO2019/105707
PCT Pub. Date: Jun. 6, 2019

(65) Prior Publication Data
US 2021/0006049 A1    Jan. 7, 2021

(30) Foreign Application Priority Data

Nov. 29, 2017  (DE) .................. 10 2017 128 226.2

(51) Int. Cl.
*H02G 1/12*        (2006.01)
(52) U.S. Cl.
CPC ................................ *H02G 1/1212* (2013.01)
(58) Field of Classification Search
CPC ....... H02G 1/12; H02G 1/1204; H02G 1/1212
(Continued)

(56) References Cited

U.S. PATENT DOCUMENTS

| 3,161,087 A | 12/1964 | Bartley |
| 3,596,541 A | 8/1971 | Bieganski |

(Continued)

FOREIGN PATENT DOCUMENTS

| DE | 33 08 053 A1 | 9/1984 |
| DE | 44 20 006 C2 | 4/1998 |

(Continued)

OTHER PUBLICATIONS

International Search Report of PCT/EP2018/080468, dated Jun. 11, 2019.

(Continued)

*Primary Examiner* — Jason Daniel Prone
(74) *Attorney, Agent, or Firm* — Collard & Roe, P.C.

(57) ABSTRACT

A wire stripper for stripping cables has two plier jaws, two outer clamping jaws, two inner cutting jaws, and two gripping parts. The cutting jaws can be displaced from a starting position into an end position by a pull rod while pressing together the gripping parts. The cutting jaws are guided on sliding block parts that rest against a sliding block fixed in the clamping jaws. The cutting jaws are moved toward each other to varying degrees through these sliding block parts, depending on a closed position of the clamping jaws, with the closed position determining the movement of the sliding block part. The sliding block parts can be manually adjusted independently of a closed position of the clamping jaws in terms of a position relative to the sliding block, while at the same time acting on both sliding block parts.

8 Claims, 25 Drawing Sheets

(58) Field of Classification Search
USPC .................................. 30/90.1; 81/9.4–9.44
See application file for complete search history.

(56) References Cited

U.S. PATENT DOCUMENTS

| | | | |
|---|---|---|---|
| 3,707,099 A | | 12/1972 | Petz |
| 3,879,981 A | | 4/1975 | Richards |
| 3,915,037 A | * | 10/1975 | Wiener ............... H02G 1/1212 81/9.43 |
| 3,964,350 A | | 6/1976 | Casadio |
| 4,329,891 A | | 5/1982 | Bieganski |
| 4,395,928 A | * | 8/1983 | Undin et al. ......... H02G 1/1212 81/9.43 |
| 4,407,174 A | * | 10/1983 | Schulze ............... H02G 1/1212 81/9.42 |
| 4,485,696 A | | 12/1984 | Bieganski |
| 4,577,405 A | | 3/1986 | Butler |
| 4,627,314 A | * | 12/1986 | Wiebe et al. ........ H02G 1/1212 81/9.43 |
| 4,768,404 A | | 9/1988 | Bieganski |
| 5,572,911 A | * | 11/1996 | Schmode et al. .... H02G 1/1212 81/9.43 |
| 5,713,249 A | * | 2/1998 | Liversidge .......... H02G 1/1212 81/9.41 |
| 5,724,870 A | | 3/1998 | Wiebe et al. |
| 5,724,871 A | | 3/1998 | Wall |
| 6,094,821 A | | 8/2000 | College et al. |
| 6,220,119 B1 | * | 4/2001 | Krampe ............... H02G 1/1212 81/9.41 |
| 6,718,848 B1 | * | 4/2004 | Liversidge .......... H02G 1/1212 81/9.41 |
| 7,513,177 B2 | | 4/2009 | Hofmann et al. |
| 7,841,260 B2 | | 11/2010 | Storm et al. |
| 7,913,588 B2 | * | 3/2011 | Storm et al. ......... H02G 1/1212 81/9.41 |
| 10,790,647 B2 | * | 9/2020 | Zinser ................. H02G 1/1212 |
| 2009/0126534 A1 | | 5/2009 | Storm et al. |
| 2010/0101379 A1 | | 4/2010 | Hofmann et al. |
| 2010/0212391 A1 | * | 8/2010 | Hofmann et al. ...... B25B 27/10 72/409.12 |
| 2016/0226229 A1 | | 8/2016 | Zinser |
| 2020/0335953 A1 | * | 10/2020 | Holland-Moritz et al. ................. H02G 1/1212 |
| 2020/0358269 A1 | * | 11/2020 | Holland-Moritz et al. ................. H02G 1/1212 |

FOREIGN PATENT DOCUMENTS

| | | |
|---|---|---|
| DE | 100 06 509 A1 | 8/2000 |
| DE | 20 2008 014 111 U1 | 3/2009 |
| EP | 0 253 528 A2 | 1/1988 |
| EP | 0 645 861 A2 | 3/1995 |
| EP | 0 707 366 A2 | 4/1996 |
| EP | 0 989 652 A1 | 3/2000 |
| EP | 1 557 920 A2 | 7/2005 |
| EP | 3 054 541 A1 | 8/2016 |
| JP | 2008-167813 A | 7/2008 |
| WO | 2008/062375 A2 | 5/2008 |

OTHER PUBLICATIONS

International Search Report of PCT/EP2018/080610, dated Mar. 8, 2019.
International Search Report of PCT/EP2018/080587, dated Feb. 22, 2019.

* cited by examiner

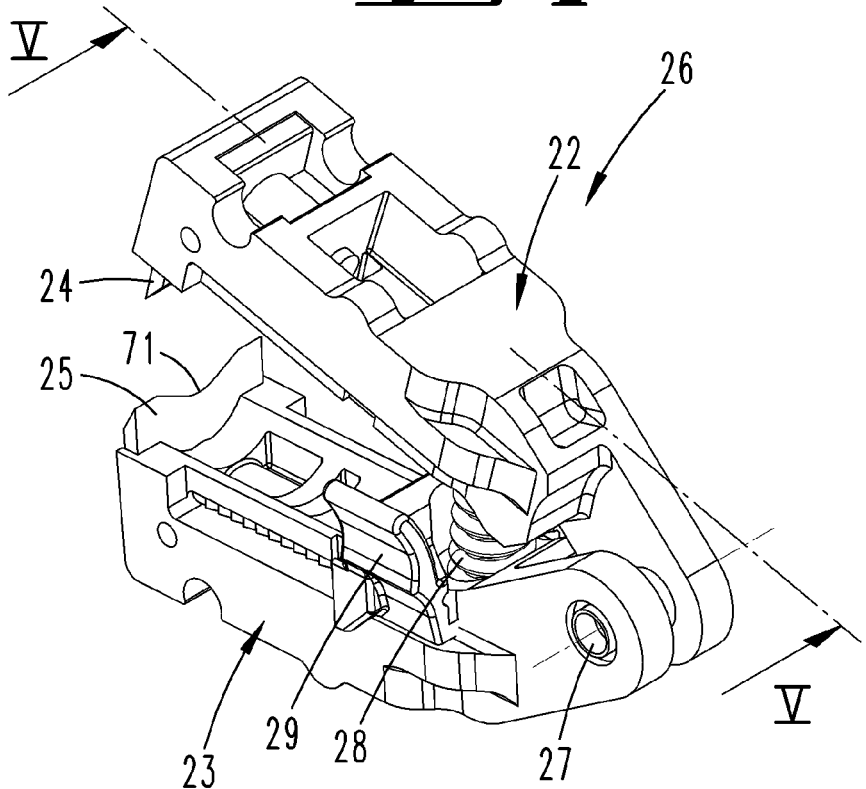
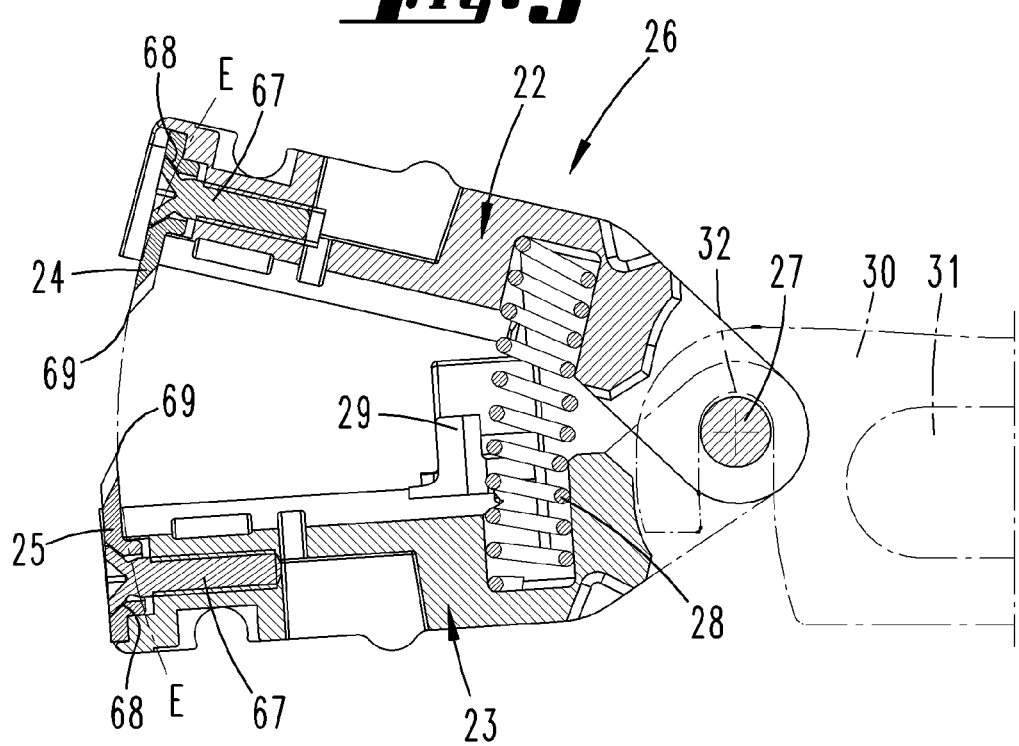

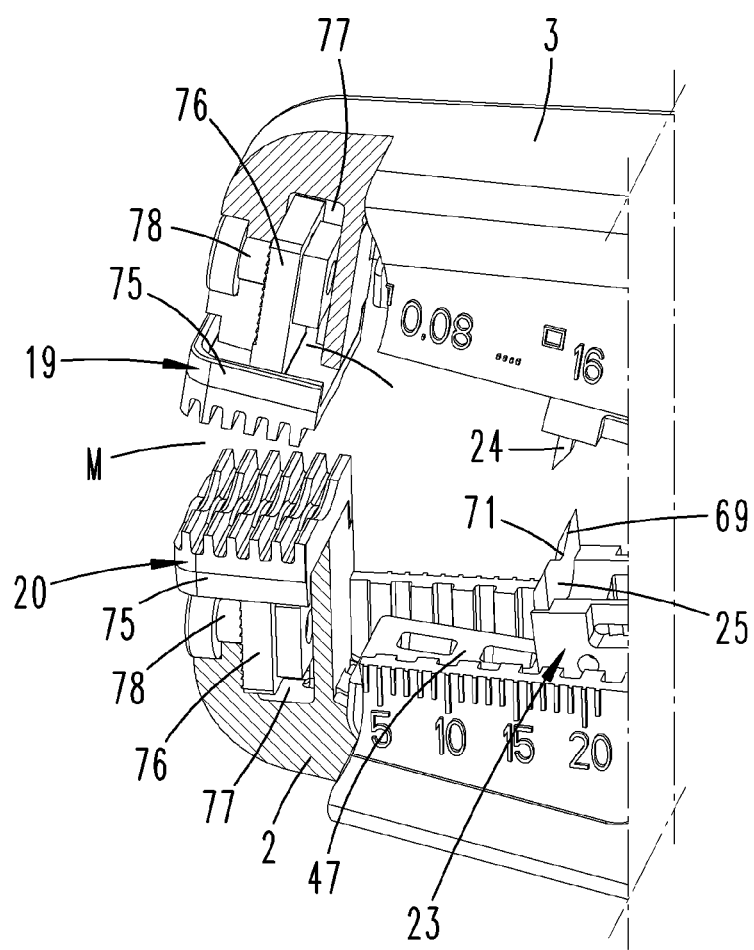

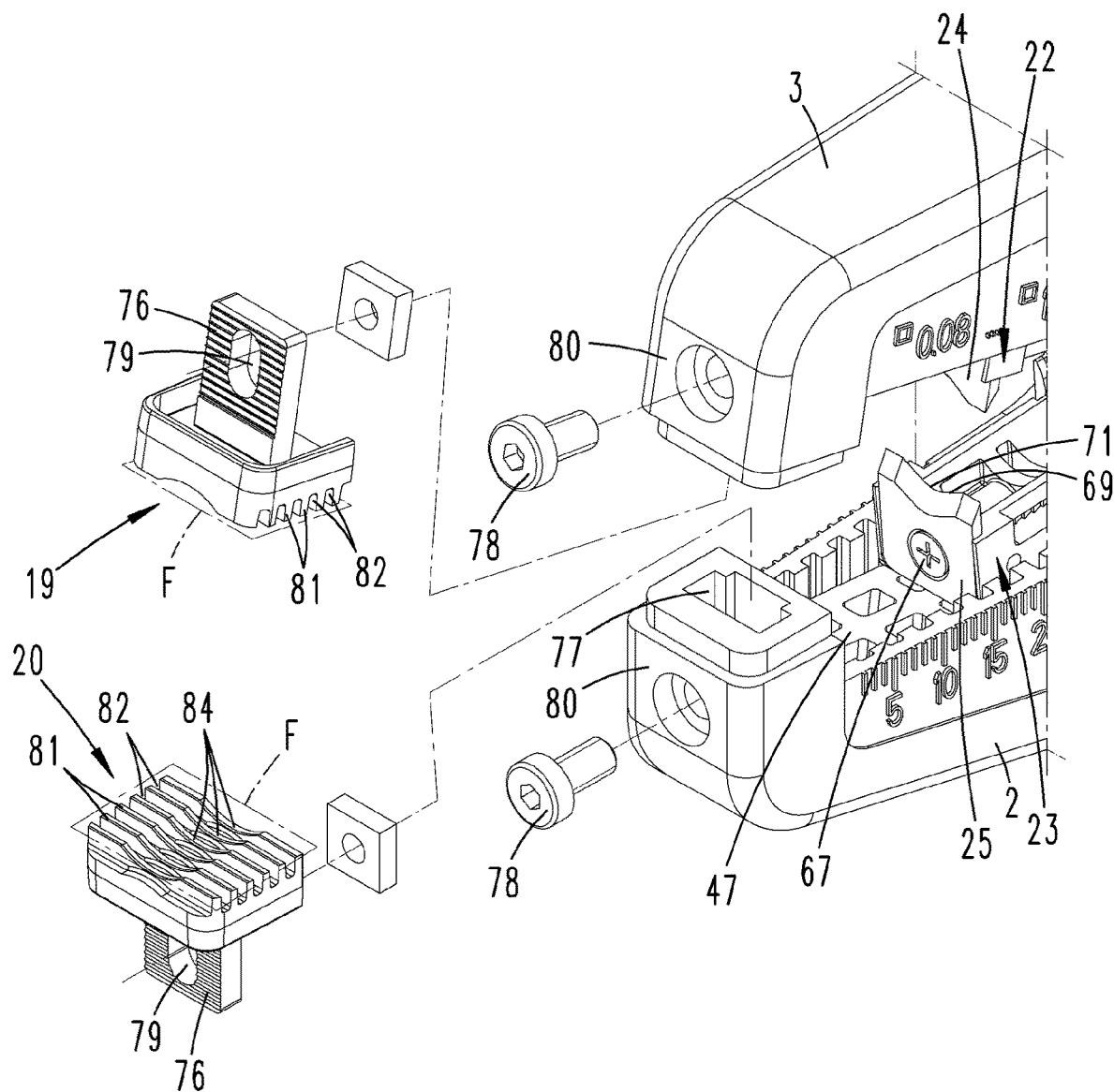

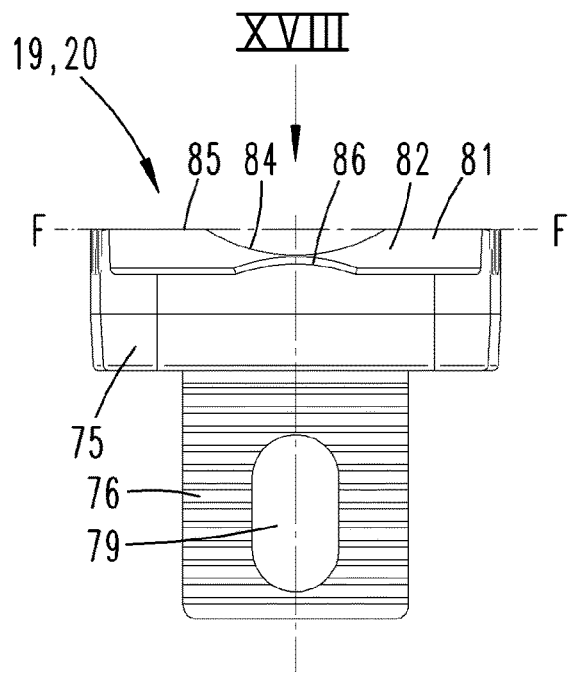
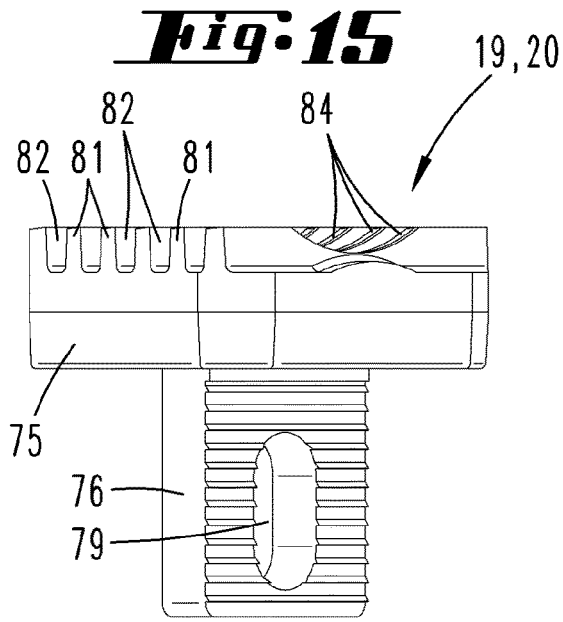
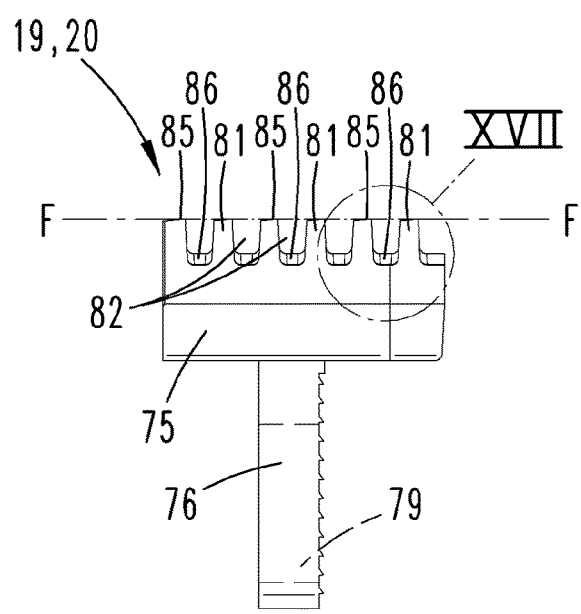

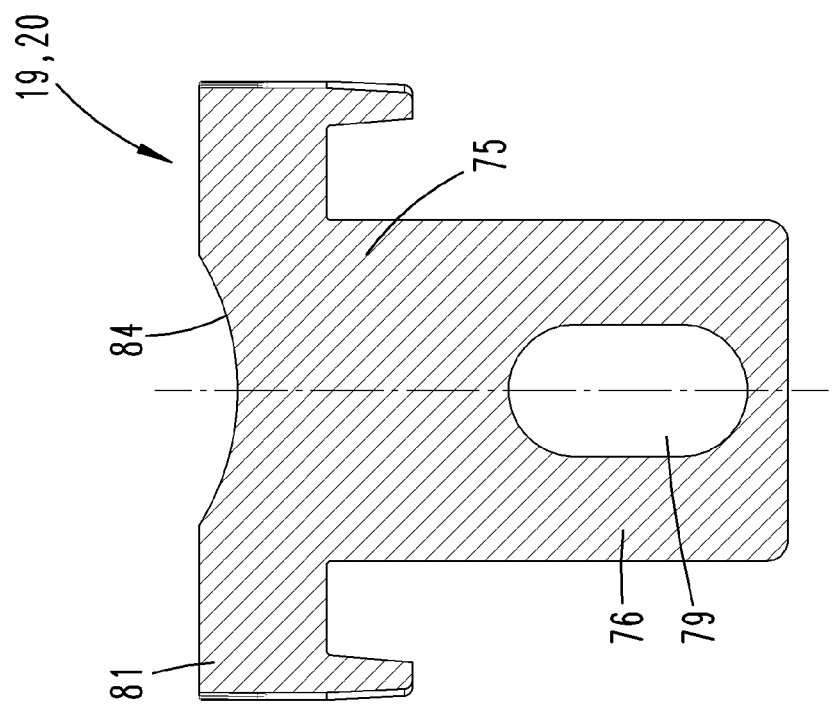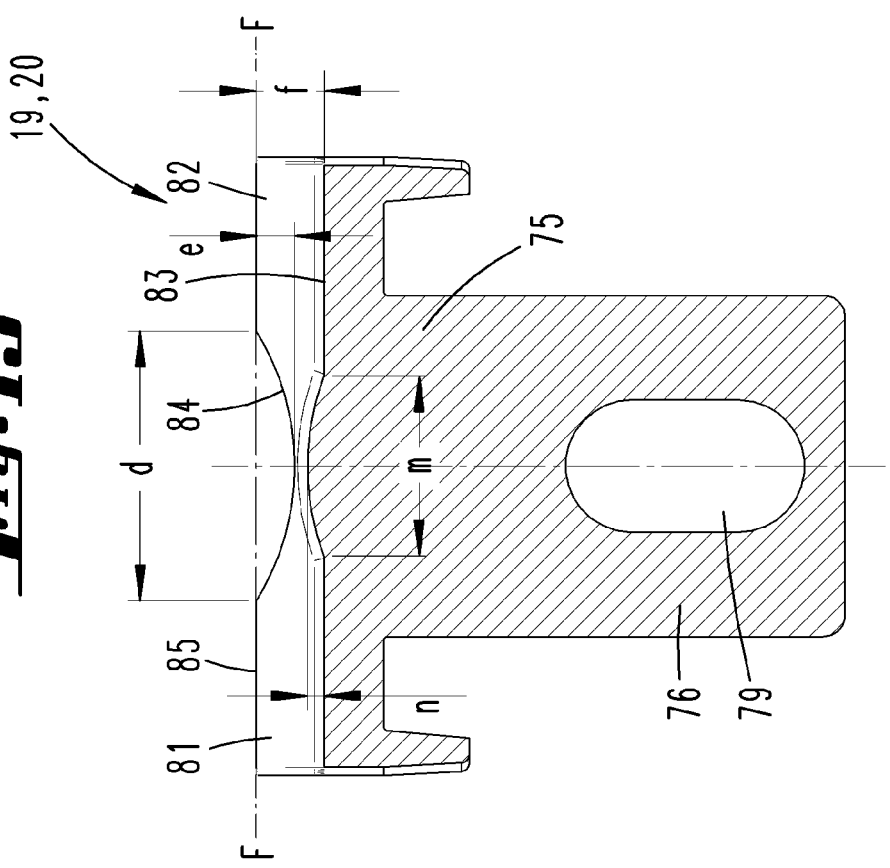

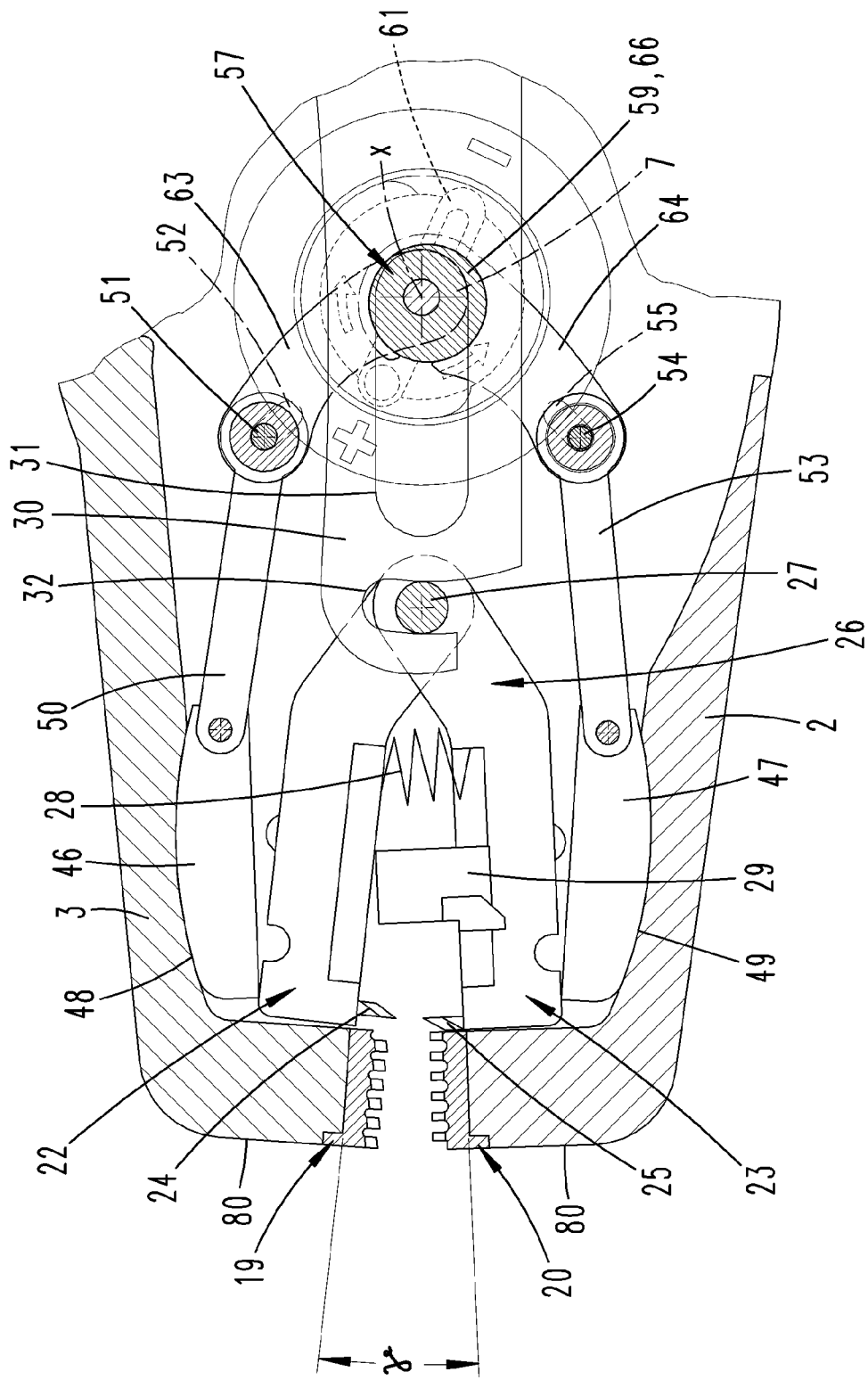

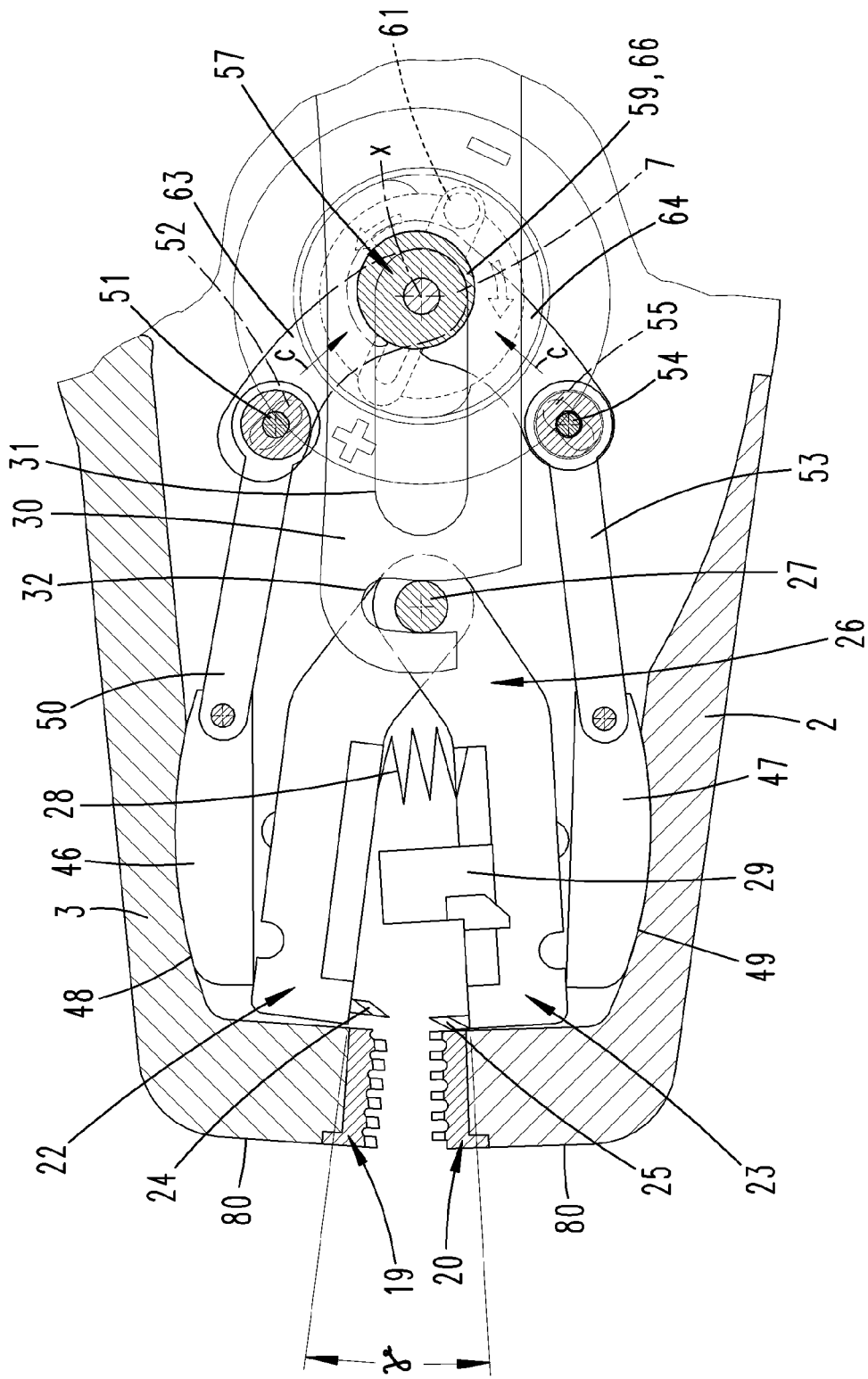

WIRE STRIPPER

CROSS REFERENCE TO RELATED APPLICATIONS

This application is the National Stage of PCT/EP2018/080587 filed on Nov. 8, 2018, which claims priority under 35 U.S.C. § 119 of German Application No. 10 2017 128 226.2 filed on Nov. 29, 2017, the disclosure of which is incorporated by reference. The international application under PCT article 21(2) was not published in English.

FIELD OF TECHNOLOGY

The invention relates to a wire stripper with two plier jaws, two outer clamping jaws, two inner cutting jaws, and two gripping parts, wherein the cutting jaws can be displaced from a starting position into an end position by a pull rod while pressing together the gripping parts, wherein the cutting jaws are further guided in their displacement direction on a sliding block part that can be moved in the displacement direction, which for its part rests against a sliding block fixed in the clamping jaws, wherein the cutting jaws are moved toward each other to varying degrees through this sliding block part, depending on a closed position of the clamping jaws, with the closed position determining the movement of the sliding block part.

PRIOR ART

Wire strippers of the kind in question are known. The latter are used to strip electrical cables. Known in this conjunction are so-called automatic wire strippers, which in a single operation cut into the insulation and then pull it off of the conductor while continuing to press together the gripping parts. The cutting depth of the cutting jaws must here be adjusted to the thickness of the insulation layer, so as not to damage the conductor to be exposed.

Known in this conjunction are wire strippers that automatically set the cutting depth of the cutting jaws as a function of the cable thickness. For example, reference is made to EP 1 557 920 B1 (U.S. Pat. No. 7,513,177 B2). The content of this patent specification is hereby incorporated into the disclosure of the present invention in its entirety, also for the purpose of including features of this patent specification in claims of the present invention.

SUMMARY OF THE INVENTION

Proceeding from the initially mentioned prior art, the invention deals with the problem of advantageously further developing a wire stripper of the kind known from EP 1557920 B1 in such a way that a refined cutting depth adjustment can be achieved.

Known from EP 3054541 A1 is a wire stripper, in which a cutting depth of the cutting edges of the cutting jaws can only be set manually, and in one extensively described embodiment, only on one side.

This problem is initially solved in the by a wire stripper for stripping cables with two plier jaws, two outer clamping jaws, two inner cutting jaws, and two gripping parts, wherein the cutting jaws can be displaced from a starting position into an end position by a pull rod while pressing together the gripping parts. The cutting jaws are further guided in their displacement direction on sliding block parts that can be moved in the displacement direction, which for their part rest against a sliding block fixed in the clamping jaws. The cutting jaws are moved toward each other to varying degrees through these sliding block parts, depending on a closed position of the clamping jaws, with the closed position determining the movement of the sliding block part. In the present invention, the emphasis is placed on providing two sliding block parts, wherein a first sliding block part acts on the cutting jaw allocated to the movable plier jaw, and a second sliding block part acts on the cutting jaw allocated to the fixed plier jaw, and the sliding block parts can be manually adjusted independently of a closed position of the clamping jaws in terms of-4ts a position relative to the sliding block, while at the same time acting on both sliding block parts.

This problem is further solved in the wire stripper as described above, wherein the emphasis is placed on the fact that the sliding block part can be manually adjusted independently of a closed position of the clamping jaws in terms of a position relative to the sliding block, that one plier jaw is fixed, and one plier jaw is movable in a rotational movement relative to the fixed plier jaw, that the sliding block part is slidably and rotatably mounted on the movable plier jaw, that the slidable mounting is achieved by means of a rotational axis, that the rotational axis can be adjusted relative to the movable plier jaw independently of a closed position of the clamping jaws in relation to each other, that the adjustability can be achieved by way of a first and/or second eccentric, that the first and/or second eccentric are formed on a shared eccentric part with the shared rotational axis, and that the first and/or second eccentric are connected with the sliding block part by means of a first and a second handlebar and a first or second axis.

Apart from an automatic adjustment of the cutting depth by allowing a relative displacement of the sliding block part, upon which the allocated cutting jaw rests, as further known from the previously cited prior art, the proposed configuration additionally enables a manual adjustability of the sliding block part.

As experience has shown, the thickness of the insulation to be cut and then pulled off can vary, for example even in cables with the same conductor cross section that come from different batches or different manufacturers. In such cases, the proposed solution permits an additional adjustment of the cutting depth. The displacement of the sliding block part relative to the allocated sliding block is here independent of a closed position of the clamping jaws.

As concerns the additional manual adjustment, the wire stripper can be provided with a suitable handle, with which the cutting depth of the cutting jaws that is automatically set while using the wire strippers can be additionally decreased or even increased.

One plier jaw is fixed, and one plier jaw is movable in a rotational movement relative to the fixed plier jaw. The fixed plier jaw can here be fixedly connected with the accompanying gripping part, while the movable plier jaw is possibly only indirectly connected with the second gripping part, for example in a known manner via a lever mechanism, which causes the movable plier jaw to pivot relative to the fixed plier jaw while pressing together the gripping parts.

In a possible embodiment, the sliding block part can be slidably mounted on the movable plier jaw with respect to a (geometric) rotational axis. The displaceability of the sliding block part relative to the allocated sliding block is preferably limited. A possible displacement path of the sliding block part might arise due to the known automatic setting of the cutting depth as a function of cable thickness. Further provided is the option of a manual intervention, with which a starting position of the sliding block part relative to the sliding block can be altered. The displacement of the sliding block part relative to the sliding block takes place from this potentially altered starting position while pressing together the gripping parts.

In another detail, the sliding block part can preferably be moved by means of a coupling rod rotatably connected with the sliding block part and/or a handlebar rotatably connected with the sliding block. The rotational angles that actually arise during a stripping operation are here comparatively slight, for example only within a range of single-digit angular degrees, or for example up to 20 angular degrees. A rotational axis formed between the coupling rod and/or handlebar and the sliding block part can further preferably be used for changing the relative starting position. For example, the rotational axis can be designed as an eccentric part, so that the distance to the sliding block part can hereby be altered proceeding from a geometric rotational axis.

The basically given movable rotational mounting of such a rotational axis provides the necessary mobility and simultaneous guidance.

As a consequence, the rotational axis can be adjusted relative to the movable plier jaw and/or relative to the fixed plier jaw independently of a closed position of the clamping jaws in relation to each other. Altering the starting position of the rotational axis makes it possible to refine the automatic cutting depth adjustment.

As further preferred, two sliding block parts can be provided, wherein a first sliding block part acts on the cutting jaw allocated to the movable plier jaw, and a second sliding block part acts on the cutting jaw allocated to the fixed plier jaw. The first sliding block part interacts with a first sliding block in the movable plier jaw, and the second sliding block interacts with a second sliding block in the fixed plier jaw.

The displacement of sliding block parts relative to the sliding blocks or allocated plier jaw is further preferably coupled, so that identical displacement distances of the sliding block parts are given while handling the wire strippers according to the cited prior art. In a preferred embodiment, the same effect is present on both sliding block parts, even given the capability of (manual) adjustment independently of a closed position of the clamping jaws as proposed according to the invention.

The sliding block part allocated to the movable plier jaw can further be mounted in the fixed plier jaw by way of a first axis guided in a first oblong hole. In a preferred embodiment, the resultantly formed rotational axis extends transverse to a displacement direction of the allocated cutting jaw. In an equivalent manner, the sliding block part allocated to the fixed plier jaw can be mounted in the movable plier jaw by way of a second axis guided in a second oblong hole. The geometric rotational axis of this second axis also extends preferably transverse to a displacement direction of the sliding block part. In one possible embodiment, the sliding block part is thus coupled with the movable plier jaw indirectly, and preferably only over a partial path of the pivoting path of the movable plier jaw.

The engagement by the first axis into the first oblong hole along with the engagement by the second axis into the second oblong hole correspondingly provide a guide, as well as the ability to displace the respective sliding block part relative to the plier jaw having the respective oblong hole. The boundary of the oblong hole viewed in the longitudinal extension of the respective oblong hole can provide a stop for the axis, and thereby further define a maximum adjustability of the cutting depth of the cutting jaws.

As concerns a (manual) presetting of the starting position of one or both sliding block parts, the relative arrangement of the first and/or second axis in the first and/or second oblong hole can be adjustable independently of a pivoting position of the clamping jaws relative to each other, or such an independent setting can be produced by an action at some other location on a shift mechanism of the sliding block part(s). The shift mechanism is here preferably comprised of the addressed handlebars and/or coupling rods. Having a varying starting position of the axis (axes) relative to the allocated oblong hole before starting a stripping operation enables such a varying starting position. An additional automatic cutting depth adjustment takes place proceeding from such a starting position while closing the pivoting jaws and capturing a cable to be stripped between the clamping jaws.

The additional, preferably manual, adjustability can be achieved by way of a first and/or second eccentric.

As is preferred, the eccentric can be arranged so that it can rotate, if necessary rotate to a limited extent, around a geometric axis running parallel to the previously described rotational axes on the sliding block side. For example, an eccentric disk can be involved, whose wall circulating eccentrically to the rotational axis acts indirectly or directly on the sliding block part.

Given an arrangement of two eccentrics, the latter can be identically shaped. In this regard, the shape can also vary, as is further preferable while adjusting a transmission means interspersed between the eccentric and the allocated sliding block part.

The two eccentrics can be arranged and designed so that they can rotate separately from each other around a respective rotational axis. In another possible embodiment, the first and second eccentrics are formed on a shared eccentric part with a shared rotational axis. As is preferred, the eccentric part can be a one-piece, if necessary even integrally designed part.

For purposes of indirect interaction between the eccentrics and sliding block parts, the first and/or second eccentric can also be connected by means of a first and second handlebar part with the first or second axis. In a preferred embodiment, the eccentric can act directly on the handlebar.

For example, the refinement of the cutting depth enabled by the proposed solution can be achieved by directly twisting the eccentric part. To this end, the eccentric part can be outwardly expanded for operation, and further can have a handle.

The enabled refinement allows an adjustment of the cutting depth via automatic adjustment, wherein manual adjustment offers a cutting depth regulation in the hundredth of a millimeter range, e.g., all the way to a tenth of a millimeter.

BRIEF DESCRIPTION OF THE DRAWINGS

The invention will be described below based on the attached drawing; however, the latter is only an exemplary embodiment. The drawing shows:

FIG. 4 another perspective view of the cutting jaw pair;
FIG. 5 the section along line V-V on FIG. 4.

FIG. 12 the area shown on FIG. 11 in a partially cut, perspective view;

FIG. 13 another perspective, exploded view of the area shown on FIGS. 11 and 12;

FIG. 14 a frontal view of a clamping jaw of the wire stripper;

FIG. 15 another view of the clamping jaw;

FIG. 16 a side view of the clamping jaw;

FIG. 19 the section according to line XIX-XIX on FIG. 18;

FIG. 20 the section according to line XX-XX on FIG. 18;

FIG. 35 a schematic, sectional view of area XXXV on FIG. 7;

FIG. 36 a view corresponding to FIG. 35, but after a manual cutting depth adjustment via the adjusting means arrangement.

Figure 1:
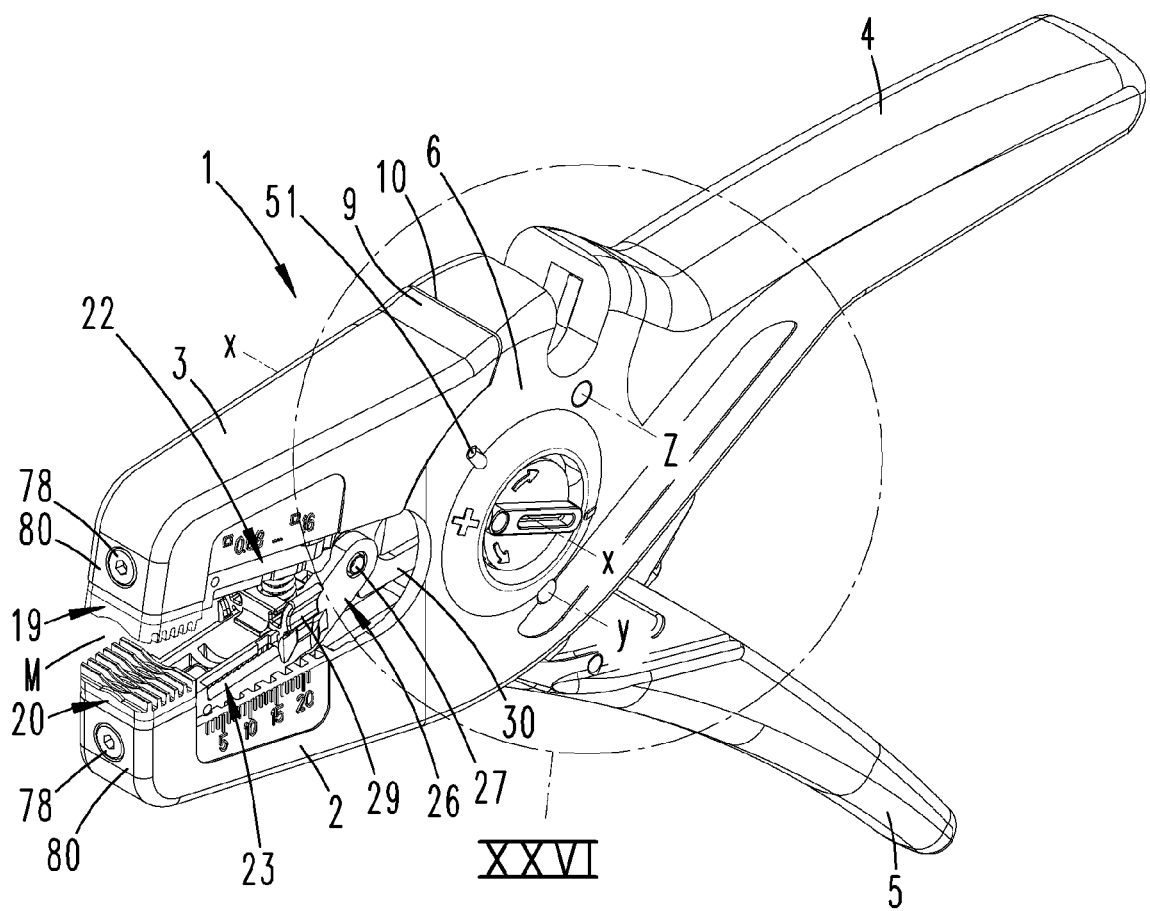
FIG. 1 a perspective view of a wire stripper.
Figure 2:
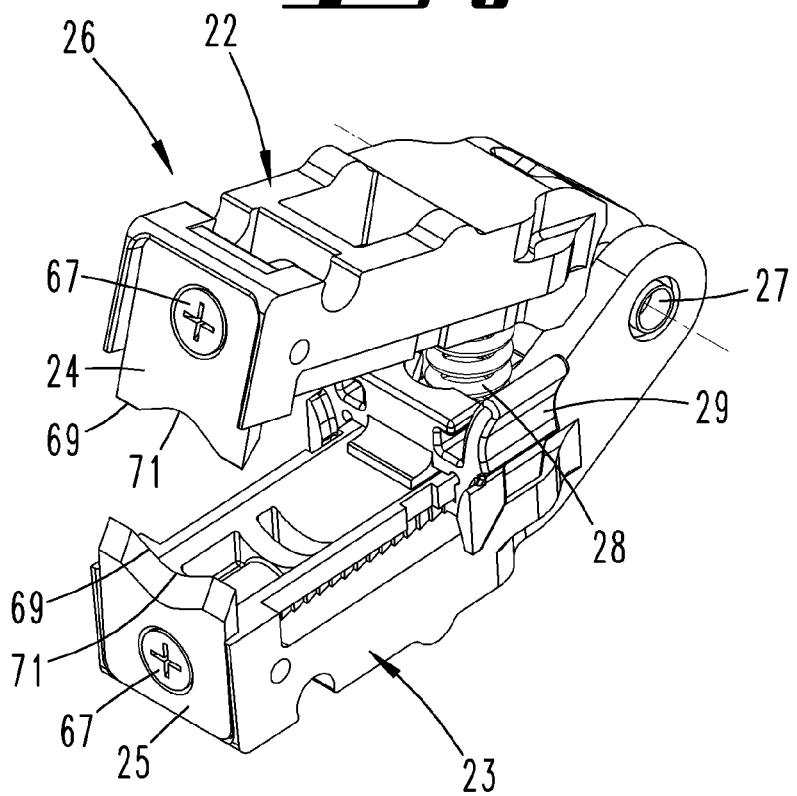
FIG. 2 a perspective, individual view of a cutting jaw pair.
Figure 3:
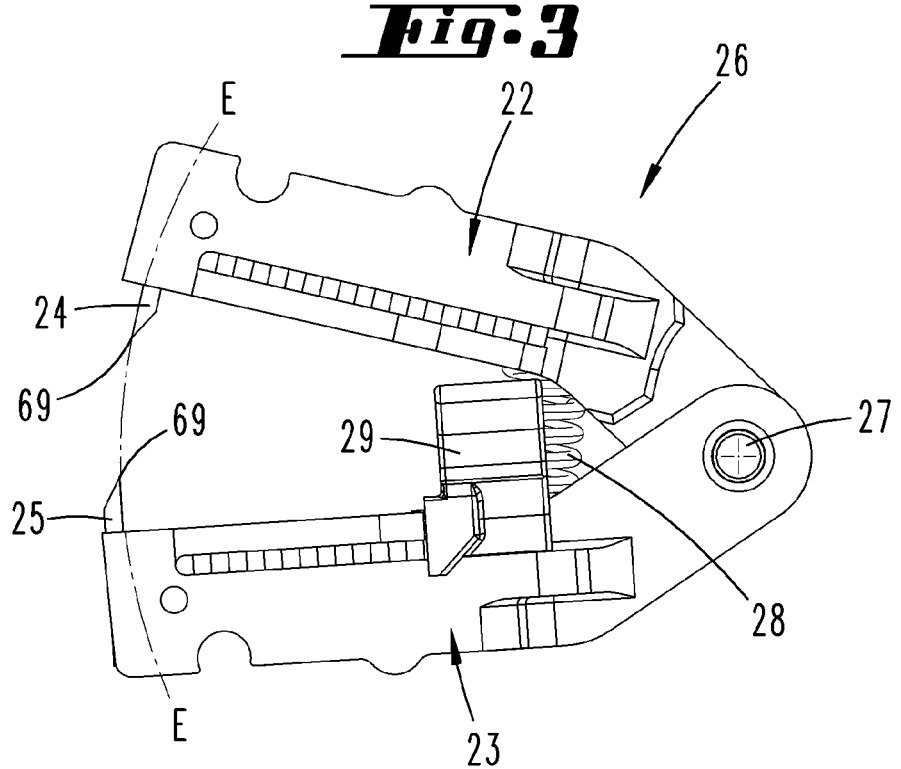
FIG. 3 a side view of the cutting jaw pair.

A wire stripper 1 with two plier jaws 2, 3 and two gripping parts 4, 5 are shown and described, initially with reference to FIG. 1. The plier jaws 2 and 3 border a plier mouth M.

The plier jaw 2 is referred to as fixed below, and connected directly and fixedly with the gripping part 4 via a cheek area 6.

In the cheek area 6, the wire stripper 1 provides a bearing for a rotational axis 7 with a geometric axis x, around which the movable plier jaw 3 to follow is rotatably mounted.

The bearing of the movable plier jaw 3 on the rotational axis 7 arises in the area of a shoulder area 8 of the movable plier jaw 3 that extends in the direction of extension of axis x in a projection toward the cheek area 6 of the fixed plier jaw 2.

Figure 6:
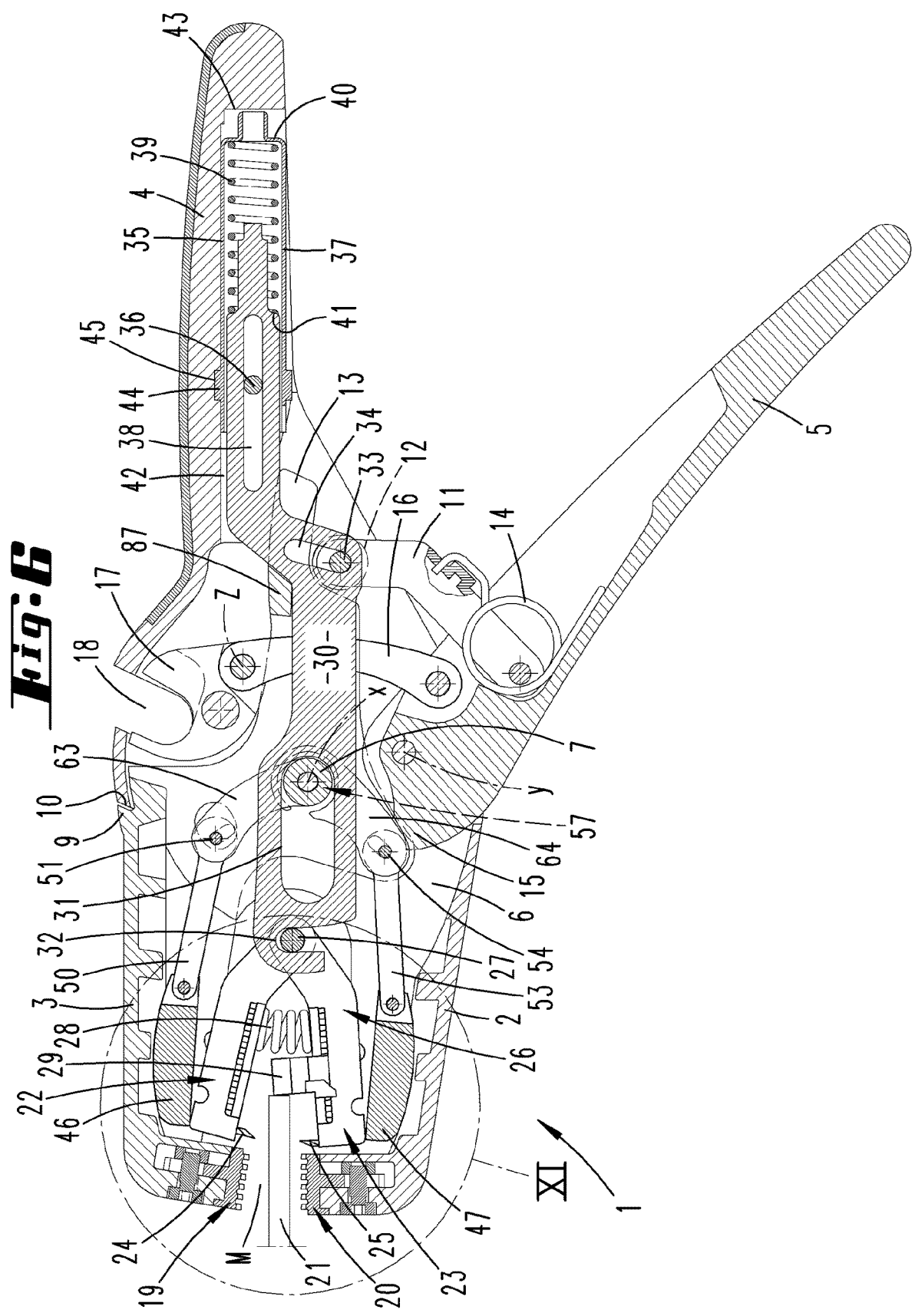
FIG. 6 a longitudinal sectional view through the wire stripper, relating to a non-activated basic position.

The plier mouth open position, for example as depicted on FIG. 6, is limited by a stop, in that a projecting area 9 on the movable plier jaw 3 is supported on an allocated support surface 10 of the fixed plier jaw 2.

The additional gripping part 5 is mounted so that it can pivot around an additional geometric axis y aligned parallel to the rotational axis 7 or its geometric axis x. The relevant physical axis is likewise mounted in the cheek area 6 of the fixed plier jaw 2 or the fixed gripping part 4.

The movable gripping part 5 can be pivoted around the axis y in the direction toward the fixed gripping part 4, wherein a pivoting displacement of the movable gripping part 5 in the direction toward the fixed gripping part 4 induces a coupled rotational movement of the movable plier jaw 3 around the axis x.

For this purpose, a preferably angularly running control lever 11 is fastened to the movable gripping part 5, and its free end, which in the exemplary embodiment shown has a roller 12 preferably arranged in this area, acts on a boom 13 (e.g., designed as a slotted gate) of the shoulder area 8 of the movable plier jaw 3.

The control lever 11 is pivotably mounted on the movable gripping part 5. The relevant pivoting axis preferably runs parallel to the geometric rotational axis x.

A restoring spring 14, preferably in the form of a leg spring, preferably acts between the control lever 11 and the movable gripping part 5. It loads the movable gripping part 5 in the direction toward the basic position shown on FIG. 6.

In this basic position, a projecting area 15 extending away from the gripping area in relation to the geometric axis y of the movable gripping part 5 acts on the shoulder area 8 of the movable plier jaw 3 in such a way that the latter is forced into its stop-limited basic position and held there.

In addition, the movable gripping part 5 acts by way of a handlebar 16 on a cutting edge 17 pivotably mounted in the cheek area 6 of the fixed plier jaw 2. The mounting of the cutting edge 17 takes place in the cheek area 6, wherein the relevant geometric axis z likewise runs parallel to the geometric rotational axis of the movable plier jaw 3.

The cutting edge 17 is exposed in a cleared area 18 of the fixed plier jaw 3 of the cheek area 6, and is preferably used to trim a cable, for example a cable to be stripped in an additional step.

As a result of the pivoting movement of the cutting edge 17 during the pivoting displacement of the movable gripping part 5 in the direction toward the fixed gripping part 4, the pivoting cutting edge 17 cuts a cable potentially enclosed in the area 18, with the cable being supported on the flanks of the cheek area 6 that border the area 18.

The two plier jaws 2 and 3 each have an outer clamping jaw 19, 20 for clamping a cable 21 placed in the plier mouth M for stripping a free end, see also FIGS. 13 to 16.

Additionally provided are two inner cutting jaws 22, 23 with respect to the arrangement of clamping jaws 19 and 20 relative to the geometric rotational axis x, respective cutting edges 24, 25 fixed in the end area facing the clamping jaws 19 and 20. The cutting edges 24 and 25 are arranged facing each other.

With reference also being made to FIGS. 2 to 5 for more detail, the cutting jaws 22 and 23 are combined into one cutting jaw pair 26, and in the area of the ends facing away from the cutting edges 24 and 25 are connected with each other via a pivot axis 27, wherein the pivot axis 27 allows the cutting jaws 22 to 23 to pivot relative to each other.

When the cutting jaw pair 26 is ready for operation, the geometric axis of the pivot axis 27 preferably extends aligned parallel to the rotational axis x of the movable plier jaw 3.

A spring 28 is arranged between the cutting jaws 22 and 23, in the exemplary embodiment shown in the form of a cylinder compression spring, wherein the spring 28 loads the cutting jaws 22 and 23 in a spaced apart open position.

In the exemplary embodiment shown, a stop carriage 29 that can be fixedly latched in the direction of extension of the cutting jaw 22 is provided on the lower cutting jaw 23, i.e., on the cutting jaw 22 allocated to the fixed plier jaw 2, so as to offer a stop for the free end of the cable 21 introduced into the plier mouth M in order to thereby define the length of the area to be stripped.

The cutting jaws 22 and 23 are laterally guided in the respectively allocated plier jaw 2, 3, for example see also FIGS. 12 and 13, to enable a proper sliding displacement of the cutting jaws 22 and 23 in the direction of the longitudinal extension, i.e., proceeding from a starting position allocated to the clamping jaws 19 and 20 in the direction of an end position that is spaced apart from the clamping jaws 19 and 20 and displaced in the direction toward the rotational axis x, and from this end position back into the starting position.

A pull rod 30 is provided for this displacement of the cutting jaws 22, 23, preferably of the cutting jaw pair 26 as a whole. The cutting jaws 22, 23 can be displaced from a starting position into an end position while pressing together the gripping parts 4, 5 against the force applied by a spring 39 acting on the pull rod 30. For this purpose, the pull rod 30 is further preferably penetrated by a tensile axis 33 that can move in an oblong hole 34, for example. In addition, the grip-side end of the pull rod 30 preferably has a shifting part fastened to the pull rod 30. The shifting part can be shifted against the force of the spring 39 relative to the pull rod 30, so as to release the pull rod 30 on a grip-side mount.

The shifting part can be designed in particular like a sleeve 35.

If the pull rod 30 is released on the grip-side mount, the pull rod 30 can be pivoted around the tensile axis 33. A corresponding pivoting movement releases the cutting jaws 22, 23 from the pull rod 30.

The pull rod 30 is also guided through the physical rotational axis, while penetrating a recess 31 resembling an oblong hole on the pull rod side.

Allocated to the pivoting axis 27 of the cutting jaw pair 26, the pull rod 30 has an insertion opening 32 essentially directed in the direction toward the fixed plier jaw 2, in addition essentially in the closing or opening direction of the cutting jaws 22 and 23. It is created by an overall hook-shaped configuration of the relevant end area of the pull rod 30.

The pivoting axis 27 of the cutting jaw pair 26 is enveloped in this insertion opening 32 in the conventional use position of the wire stripper 1, so that a sliding displacement of the pull rod 30 enabled by the recess 31 configured like an oblong hole leads to a corresponding sliding displacement of the cutting jaw pair 26.

This sliding displacement of the pull rod 30 is enabled by a coupling with the control lever 11 mounted on the movable gripping part 5, wherein this control lever 11 engages into an oblong hole 34 on the pull rod side with a tensile axis 33 aligned parallel to the rotational axis 7, which in the exemplary embodiment shown can simultaneously comprise the axis for the roller 12. A central longitudinal line of the oblong hole 34 includes an acute angle α relative to the displacement direction r of the pull rod 30 of about 60 to 85°, further for example of about 75°.

A section of the pull rod 30 that is cropped relative to the area guided in particular in the area of the rotational axis 7 and the tensile axis 33 possibly runs within the fixed gripping part 4 in the conventional use position of the wire stripper 1, but in any event allocated thereto.

In the area of the grip-side end, the pull rod 30 is enveloped by the mentioned sleeve 35. The latter is captively mounted on the pull rod 30, while allowing a sliding displaceability of the sleeve 35 relative to the pull rod 30. This is made possible owing to a pin-shaped mounting part 36 that penetrates the sleeve cross section, respectively securing the pin-shaped mounting part 36 on the end side in the area of the sleeve wall 37. The pin-shaped mounting part 36 here passes through the pull rod 30 accommodated in the sleeve 35 in the end region in the area of an additional oblong hole 38.

The spring 39 is arranged within the sleeve 35 in the form of a cylinder compression spring, which is supported at one end on the floor 40 of the sleeve 35, and at the other end on a shoulder 41 of the pull rod 30 facing the floor 40. Correspondingly, a relative displacement of the pull rod 30 and sleeve 35 in the direction of the longitudinal axis of the sleeve is enabled opposite the force of the spring 39.

In the exemplary embodiment shown, the sleeve 35 together with the allocated end region of the pull rod 30 is accommodated in a cavity 42 on the interior side of the grip, wherein the sleeve 35 can be supported on a cavity floor 43 via a pin-shaped expansion that protrudes over the floor 40 with the wire stripper 1 ready for operation.

In addition, the sleeve 35 has a latching projection 44 for engaging into a latching recess 45 formed on the gripping part 4, in particular in the area of the cavity 42.

Figure 10:
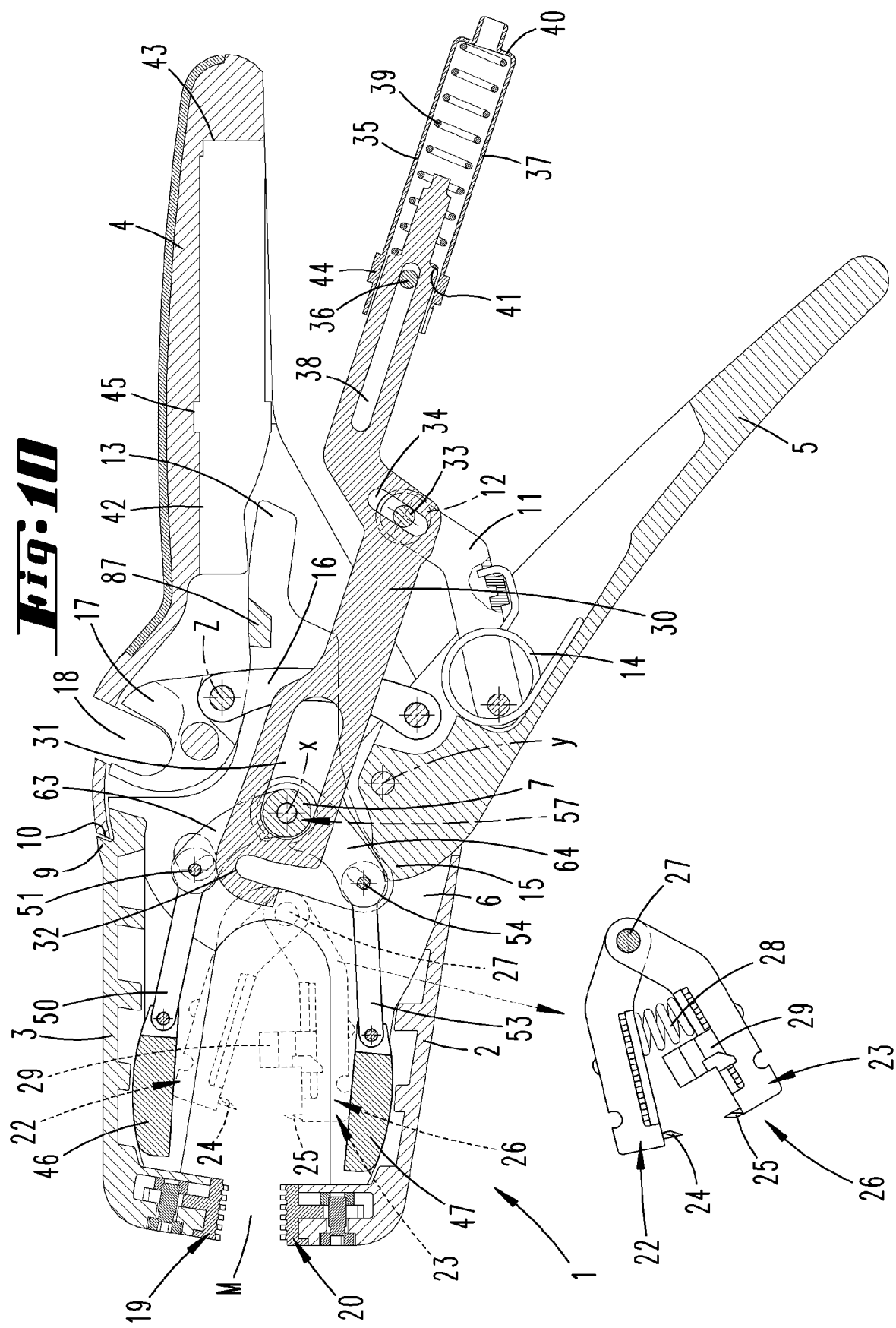
FIG. 10 a longitudinal sectional view of the wire stripper essentially corresponding to FIG. 7, relating to an unlocking position of a pull rod to permit changing out the cutting jaw pair.

The previously described arrangement and configuration of the cushioned sleeve 35 makes it possible to release the pull rod 30 from the gripping part side mount (see FIG. 10). As already explained further above, the pull rod 30 can thereafter be pivoted around the rotational axis 7, which is additionally enabled by the tensile axis 33 guided in the oblong hole 34 of the pull rod 30. As a result of this pivoting displacement of the pull rod 30 in the direction toward the movable gripping part 5, the free end of the pull rod 30 having the insertion opening 32 is made to pivot open, so as to release the pivoting axis 27 of the cutting jaw pair 26. In addition, the pivoting open of the pull rod 30 can possibly be overlapped by a linear movement guided through the rotational axis 7 engaging into the recess 31 shaped like an oblong hole. The control lever 11 entrained via the tensile axis 33 is here pivotably displaced opposite the force of the restoring spring 14.

In the pivoted open and possibly slidably displaced position of the pull rod 30 as illustrated on FIG. 10, the cutting jaw pair 26 can be conveniently removed in terms of handling, preferably while the cutting jaws 22 and 23 perform a pivoting movement in the direction toward a closed position opposite the spring 28 acting on the cutting jaws 22 and 23.

Even after a cutting jaw pair 26 has been reinserted, the proper operating position of the wire strippers 1 can be assumed more conveniently in terms of handling and without tools.

The cutting jaws 22 and 23 can be moved toward each other in the direction of a closed position opposite a spring 28 that loads the cutting jaws 22 and 23 in an open position shown on FIG. 6, for example, while bringing together the gripping legs 4 and 5.

The cutting jaws 22 and 23 can further be removed as a pair for replacement purposes. In another detail, the cutting jaws 23 and 23 are pivotably connected with each other via a pivoting axis 27, which is also preferably designed as an axial pin.

Each cutting jaw 22, 23 is supported in the allocated plier jaw 2, 3 via a sliding block part 46, 47, wherein the sliding block part 46, 47 is in turn supported on a sliding block 48, 49 fixed to the clamping jaws.

This way of indirectly supporting of the cutting jaws 22, 23 on the respective plier jaw 2, 3 is known from the EP 1 557 920 B1 mentioned at the outset. Reference is made to the contents of this patent specification with respect to the operating principle.

The sliding block part 46 or 47 resembling a sliding wedge is suitable for displacement along the sliding block 48 or 49 designed like a sliding wedge surface on the jaw side. The radii of the interacting surfaces of the sliding block part 46, 47 and sliding block 48, 49 are adjusted to each other. Provided as a whole is a sliding displaceability of the sliding block parts 46 and 47 in essentially the displacement direction r of the pull rod 30 and the cutting jaw pair 26.

The sliding block part 46 guided in the movable plier jaw 3 is preferably connected by a coupling rod 50 with the cheek area 6 of the fixed plier jaw 2 or of the fixed gripping part 4, specifically via a first axis 51 that is provided at the end side of the coupling rod 50 and guided in the cheek area 6 in a first oblong hole 52.

The sliding block part 47 guided in the fixed plier jaw 2 can also have a coupling rod 53, the end side of which can carry a second axis 54 for engaging into a second oblong hole 55 provided in the shoulder area 8 of the movable plier jaw 3.

Figure 25:
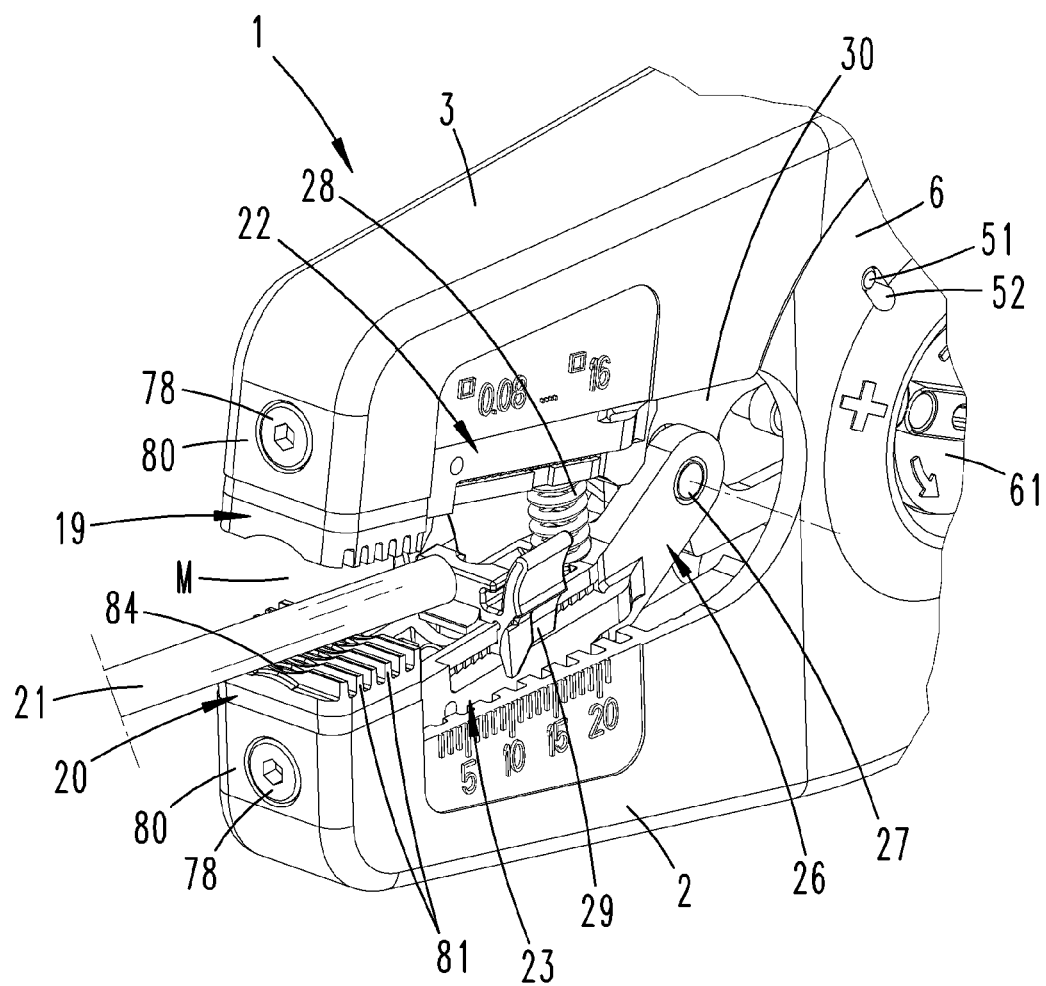
FIG. 25 a perspective view of the plier mouth area given a cable to be stripped placed between the clamping jaws.
Figure 27:
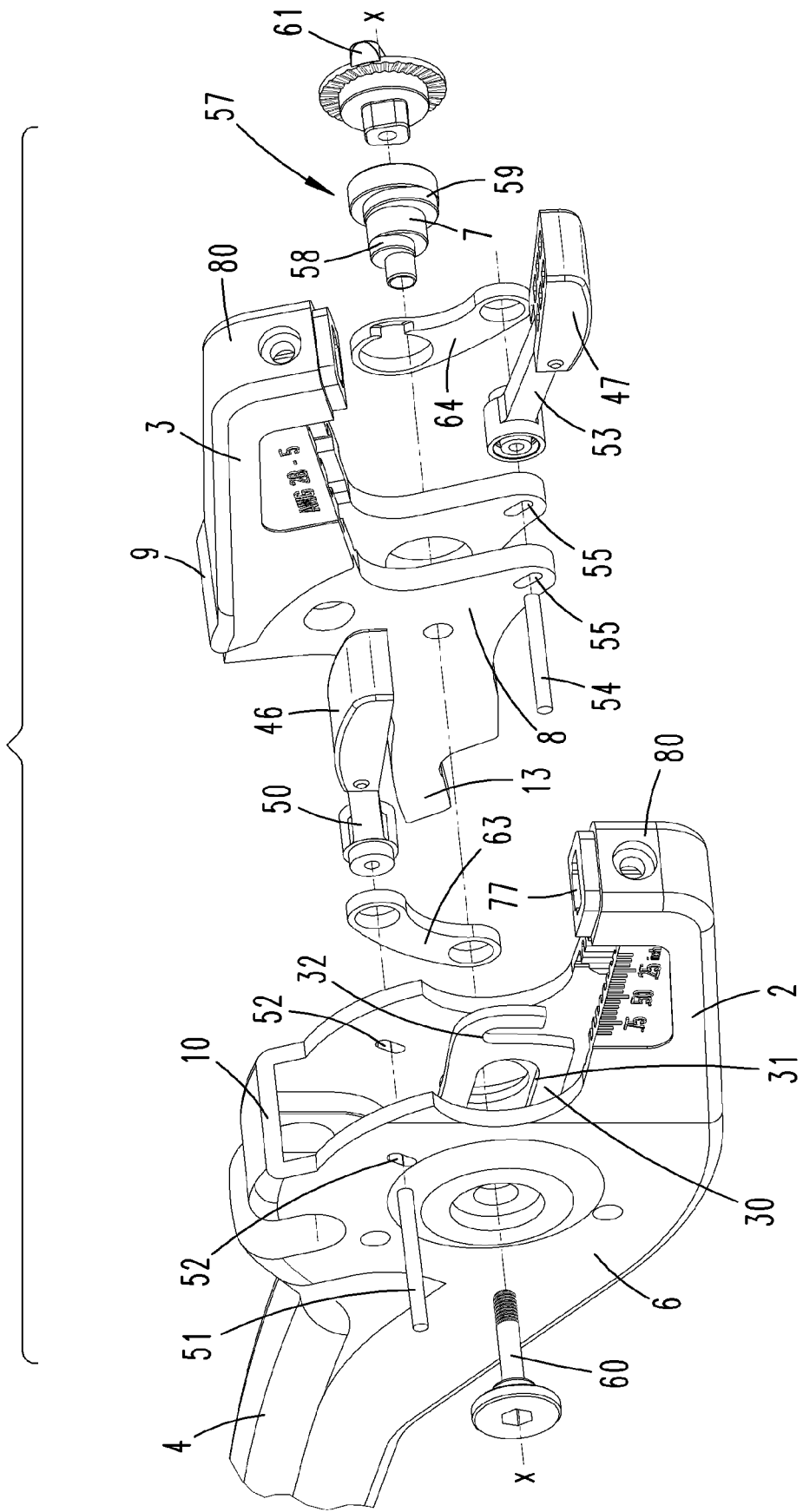
FIG. 27 an exploded, perspective view of the plier jaws of the wire stripper, as well as means for setting a cutting depth of the cutting jaws.

With respect to a basic position, for example as shown on FIG. 6, the oblong holes 52 (see also FIGS. 25) and 55 (see also FIG. 27) are aligned in relation to a projection of the latter in the direction of the geometric rotational axis x in a plane aligned perpendicular to the rotational axis in such a way as to include a respective acute angle of about 45° relative to the sliding direction r, wherein both oblong holes 52 and 55 essentially run inclined in the direction toward the rotational axis x.

In the exemplary embodiment, the cutting depth can be independently (automatically) adjusted as a function of the outer diameter of the cable by arranging the sliding block parts 46 and 47 as described above in conjunction with the sliding blocks 48 and 49 on the jaw side, and by binding the sliding block parts 46 and 47 via the coupling rods 50 and 53 to an area of the essentially opposing plier jaw.

Depending on the diameter or thickness of the cable 21 to be captured between the clamping jaws 19 and 20, different cutting depths arise for the cutting edges 24 and 25 of the cutting jaws 22 and 23 when correspondingly pressing together the gripping parts 4 and 5, since depending on the captured cable thickness and the concurrent spacing of clamping jaws 19 and 20, and accordingly of plier jaws 2 and 3, a sliding displacement of the sliding block parts 46 and 47 along the sliding blocks 48, 49 also takes place, so that the supporting point for the cutting jaws 22 and 23 on the sliding block parts 46 and 47 changes. Depending on the cable thickness, the sliding block parts 46 and 47 are displaced in equal measure in or opposite the displacement direction r via the coupling rods 50 and 53.

While pressing together the gripping parts 4 and 5 and correspondingly the plier jaws 2 and 3 and relatedly deflecting the movable plier jaw 3 around the rotational axis 7, the cutting depth is set by slightly pulling the lower sliding block part 47 in the fixed plier jaw 2 away from the mouth tip via the coupling rod 53 connected with the movable plier jaw 3. The sliding block part 47 is here shifted by an amount. This shifting closes the allocated cutting jaw 23 by an infeed amount, while at the same time changing the angular position of the sliding block part 47.

A deflection of the movable plier jaw 3 takes place synchronously thereto via the sliding block part 46 connected with the fixed plier jaw 2 by the coupling rod 50, so that a movement of the sliding block part 46 relative to the allocated sliding block 48 takes place in the same direction as for the sliding block 47. An infeed movement of the allocated cutting jaw 22 perpendicular to the longitudinal shifting and the positional correction of the sliding block part 46 thus take place here as well.

Figure 7:
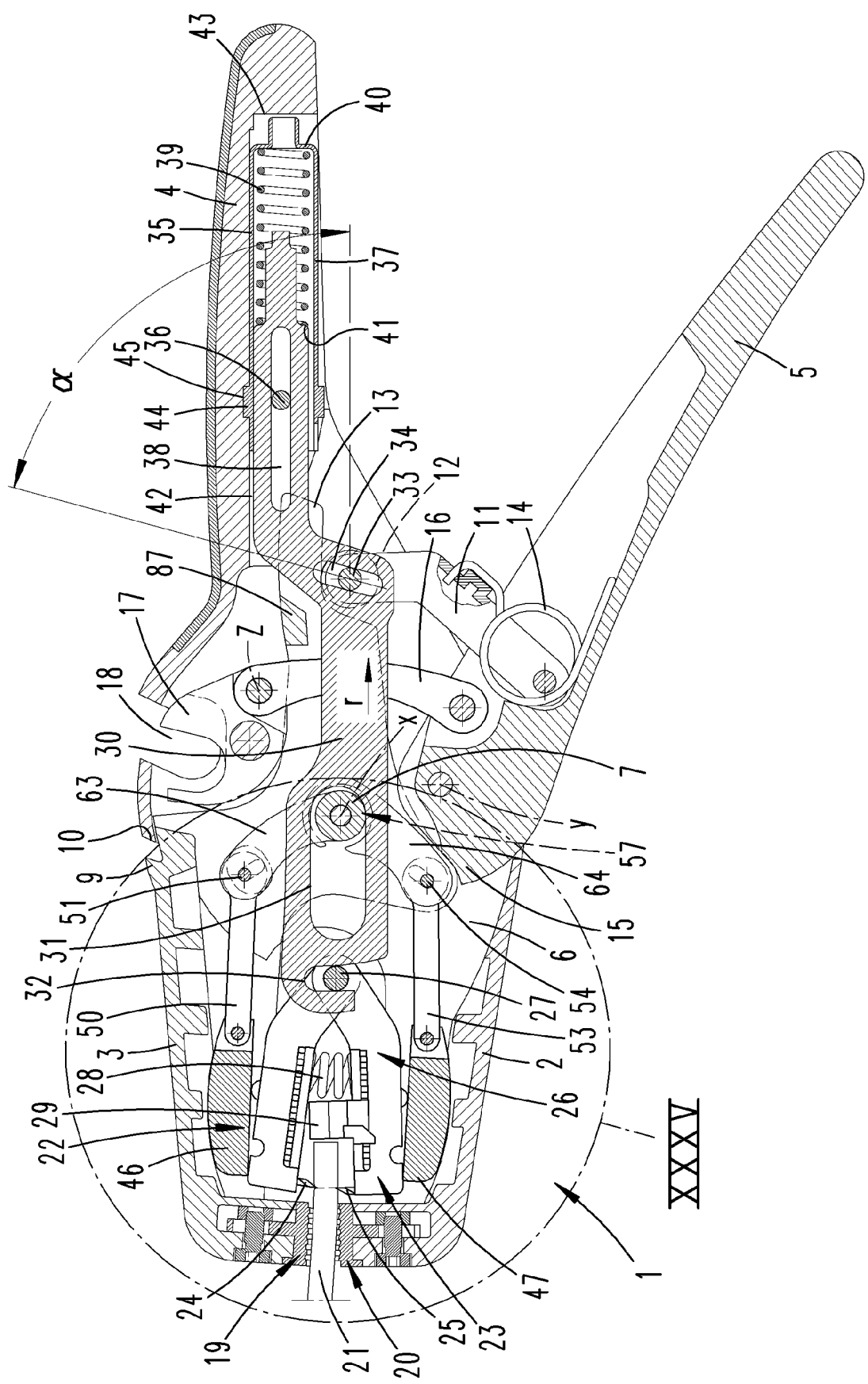
FIG. 7 a view corresponding to FIG. 6, but relating to an intermediate position during activation.

While pressing together the gripping parts 4 and 5, the plier mouth M is initially closed by a corresponding pivoting displacement of the movable plier jaw 3 superposed by a closure of the cutting jaw pair 26 (see FIG. 7). The cutting edges 17 of the cutting jaws 22 and 23 cut into the insulating jacket of the cable 21, doing so with a cutting depth that is automatically set as a function of the cable thickness according to the embodiment described above.

The pivoting displacement of the movable plier jaw 3 is achieved by correspondingly impinging the roller 12 arranged on the control lever 11 on a facing control surface of the boom 13 aligned in roughly the displacement direction r in the basic position of the wire stripper 1.

Figure 8:
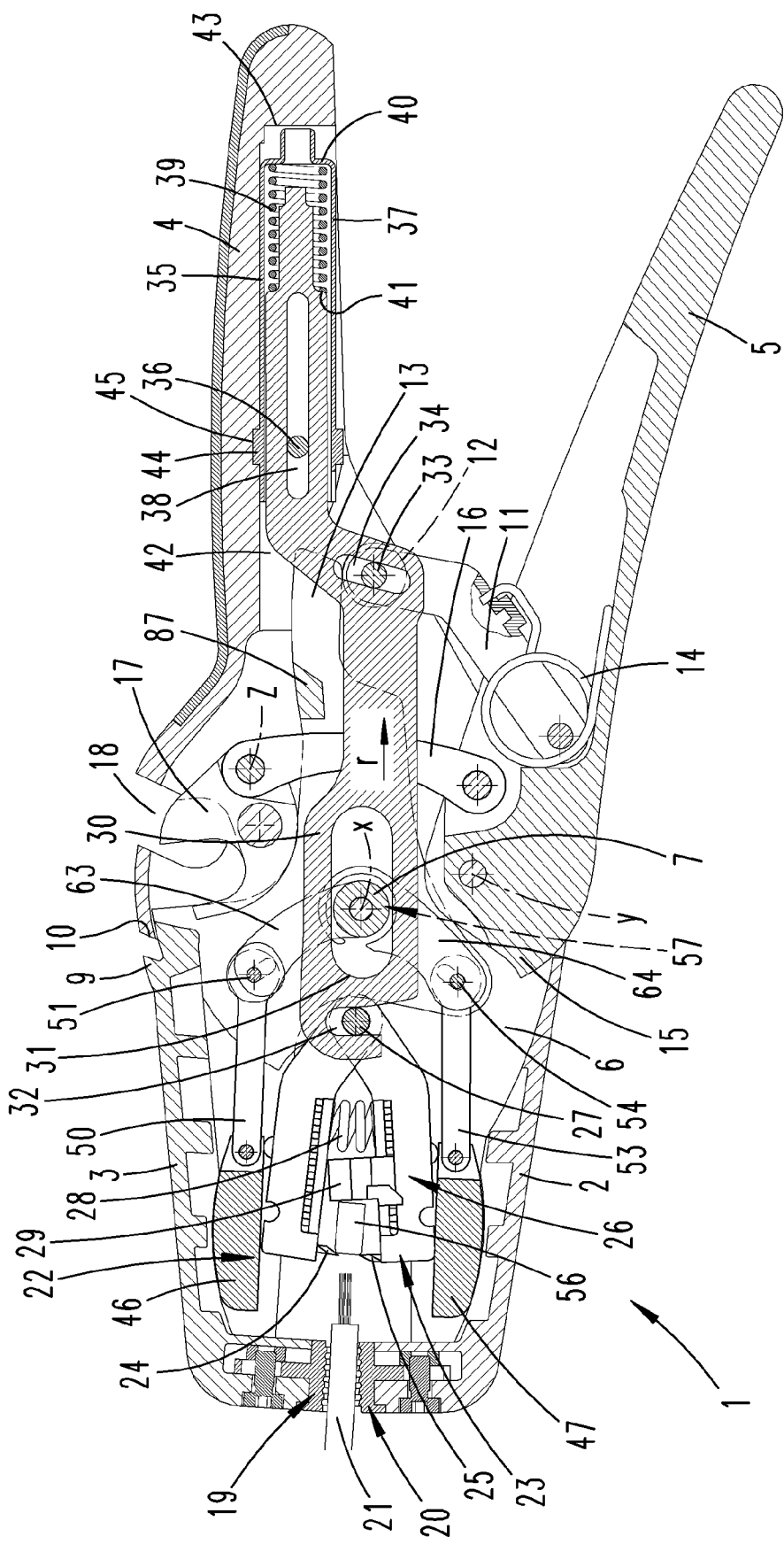
FIG. 8 a subsequent view to FIG. 7 during the continued activation of the wire stripper.

As the movable gripping part 5 continues to be pivotably displaced in the direction toward the fixed gripping part 4 according to the illustration on FIG. 8, the roller 12 of the boom 13 slides along the facing and previously described front surface of the boom 13, overcoming the restoring force of the spring 39 acting on the pull rod 30 in the sleeve 35. The pull rod 30 is linearly pulled in the sliding direction r, taking along the cutting jaw pair 26. As a result, the insulating section 56 separated by the cutting of the cutting edges 17 is stripped from the conductor.

Figure 9:
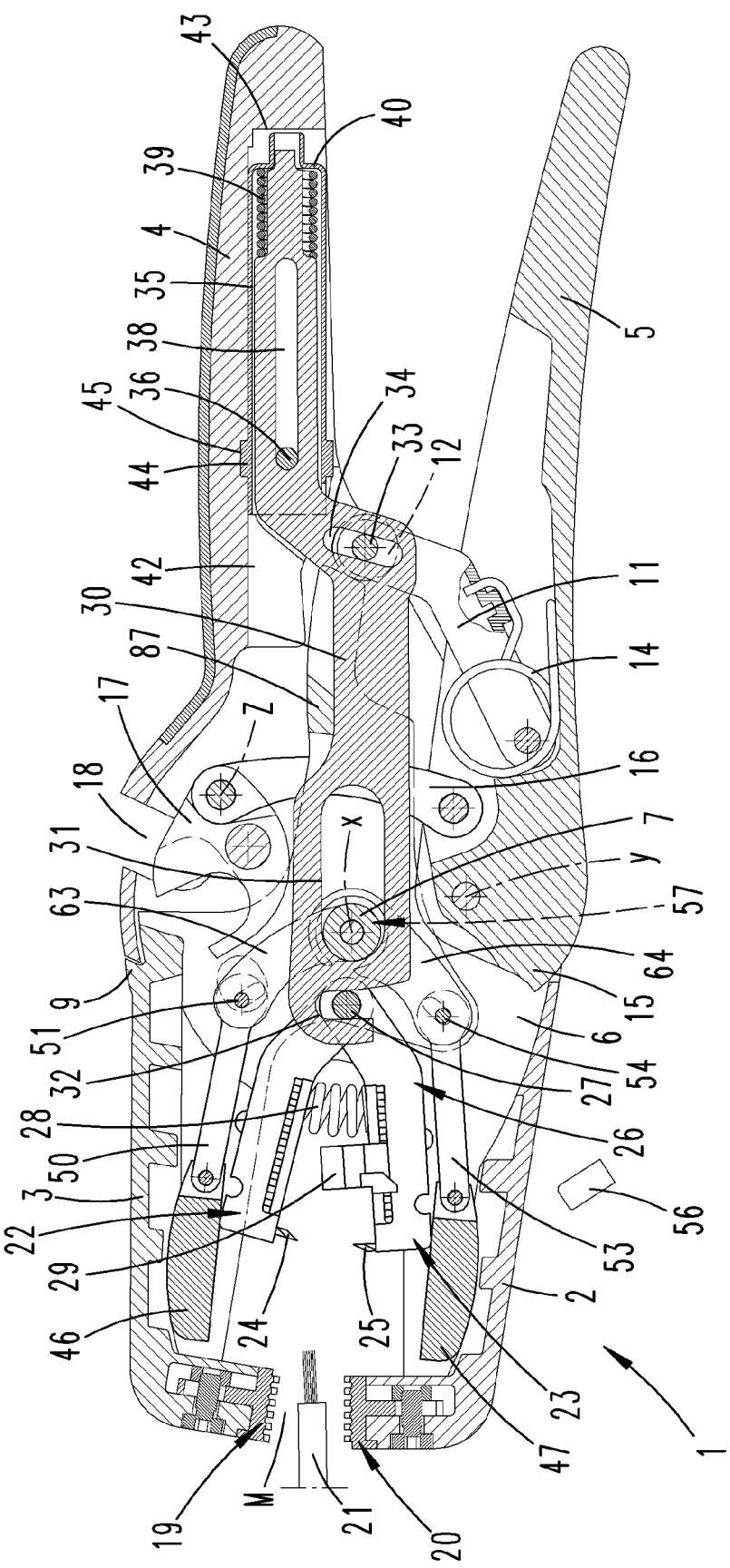
FIG. 9 a subsequent view to FIG. 8, relating to the end activation position.

According to the illustration on FIG. 9, while the gripping parts 4 and 5 continue to be pressed together, the boom-side roller 12 exits the supporting position relative to the boom 13 of the movable plier jaw 3, which pivots back in the direction toward its open basic position, accompanied simultaneously by the opening of the plier mouth M, as well as of the cutting jaw pair 26. Among other things, this is caused by the restoring force of the spring 28 provided between the cutting jaws 22 and 23.

The cable 31 stripped at its end is exposed for removal from the wire stripper 1. The separated and removed insulating section 56 is exposed for removal, or can automatically fall out of the plier mouth M.

Figure 26:
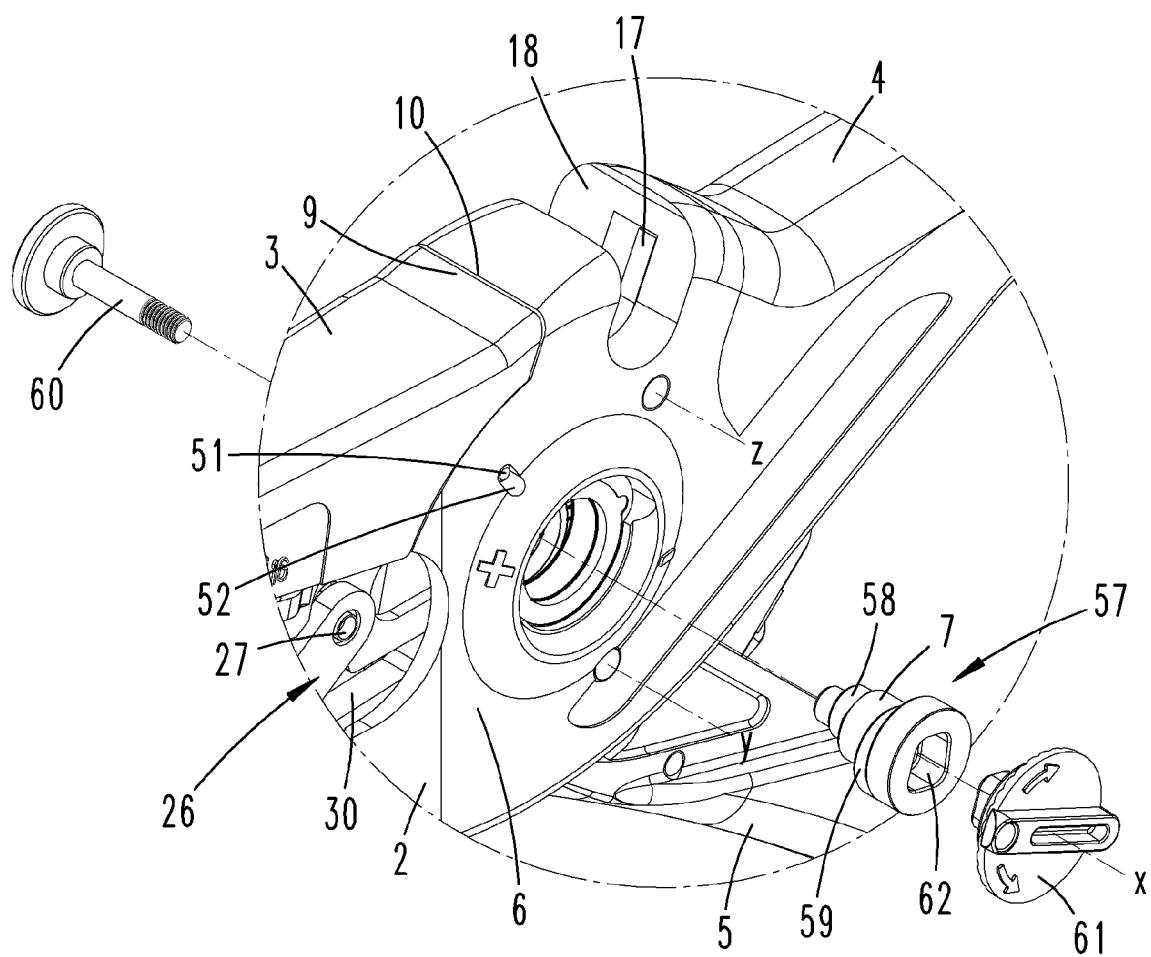
FIG. 26 a partially exploded, perspective view of area XXVI on FIG. 1.

A central adjusting means can be provided to enable a calibration of the automatic cutting depth adjustment of the cutting edges 24 and 25 of the cutting jaws 22 and 23. As exemplarily illustrated on FIG. 26, the latter can be an integrally designed eccentric part 57 with two eccentrics 58 and 59 spaced apart from each other in the axial direction of the eccentric part 57. In this regard, further reference is made to FIGS. 31 to 34.

As also depicted, the eccentric part 57 can additionally comprise the rotational axis 7, in particular taking the form of a partial eccentric area with a circular and concentric cross section formed between the eccentrics 58 and 59.

Figure 28:
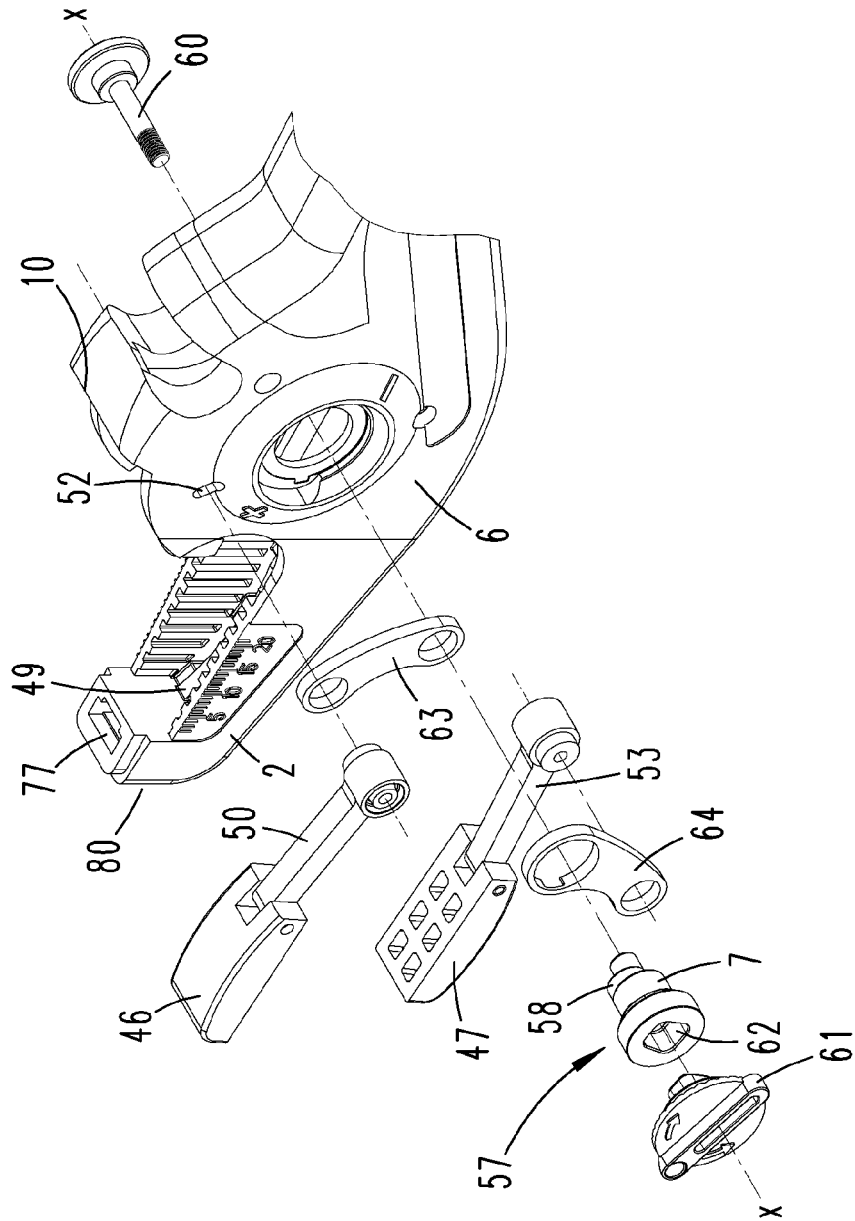
FIG. 28 another perspective view according to FIG. 27.

The eccentric part 57 (see also FIG. 28) can be designed like a hollow shaft for passing through a central, massive shaft. The latter can further be comprised of a threaded bolt 60, which can be used to rotationally mount the eccentric part 57 to the cheek area 6 of the fixed plier jaw 2. The end side of the threaded bolt 60 is here supported with a collar on the cheek side. Opposite this collar in the axial direction, bolting takes place with an outwardly accessible, plate-shaped handle 61, which with a depicted square extension non-rotatably engages into a correspondingly designed coaxial recess 62 of the eccentric part 57. A rotational displacement of the handle 61 around the geometric rotational axis x correspondingly leads to a rotational displacement of the eccentric part 57 as a whole. A latching rotational displacement can also be provided.

The second eccentric 59 facing the handle 61 relative to the central area of the eccentric part 57 forming the rotational axis can be designed with a larger diameter overall, i.e., even relative to the cam-shaped expansion, than that of the section forming the rotational axis 7, while the additional first eccentric 58 formed remote to the handle 61 can be designed with a smaller diameter relative to the central area comprising the rotational axis 7.

Figure 30:
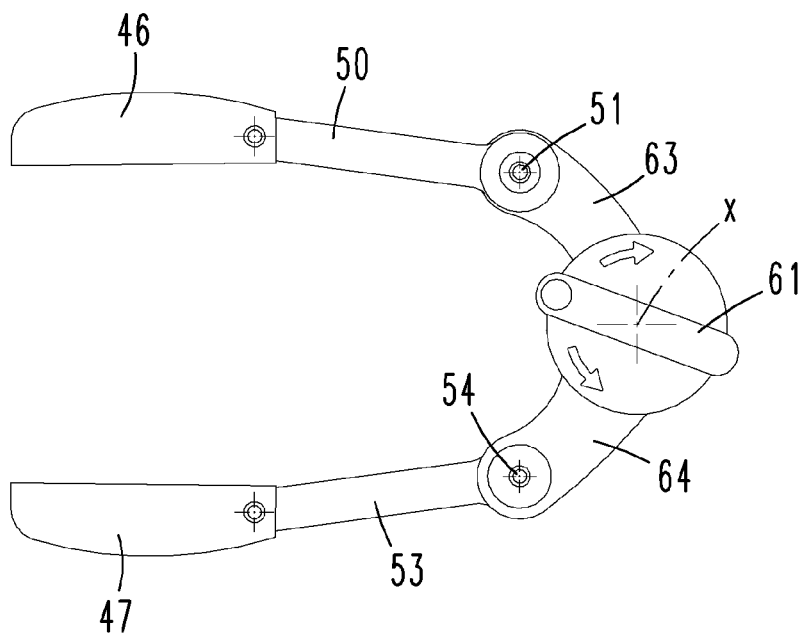
FIG. 30 a side view of the adjusting means arrangement.
Figure 31:
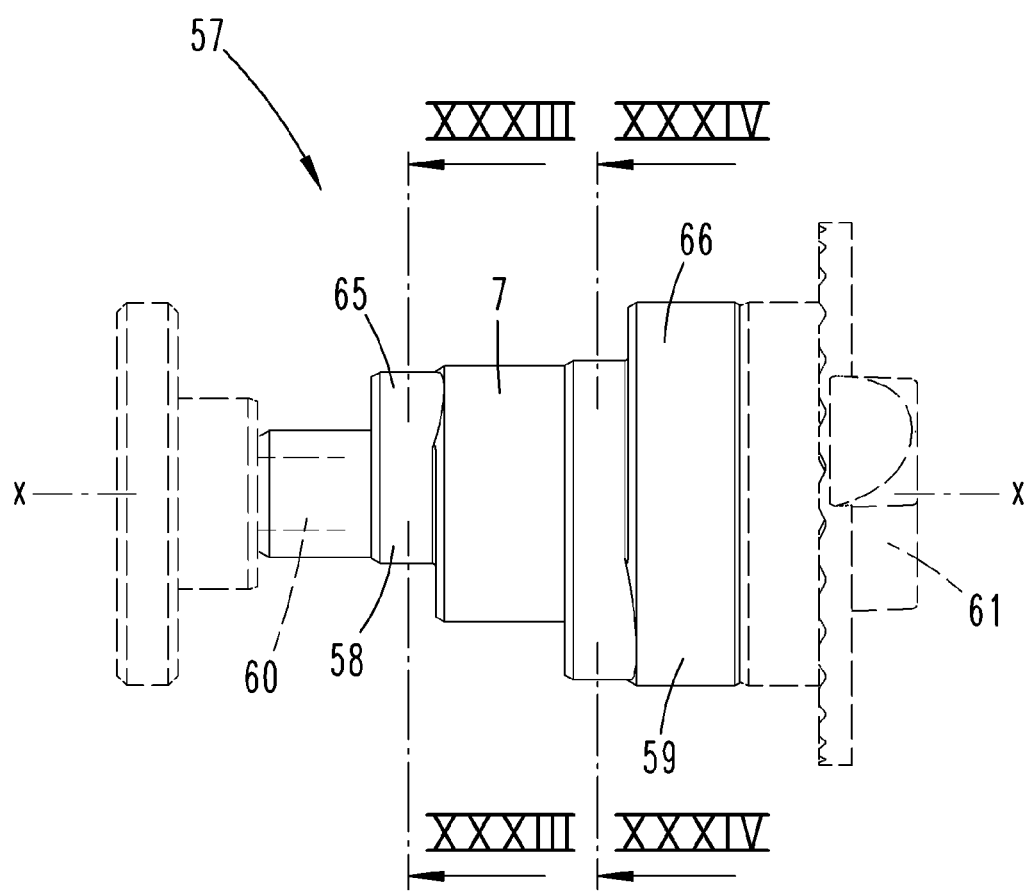
FIG. 31 a side view of an eccentric part of the adjusting means arrangement with a first and second eccentric.
Figure 32:
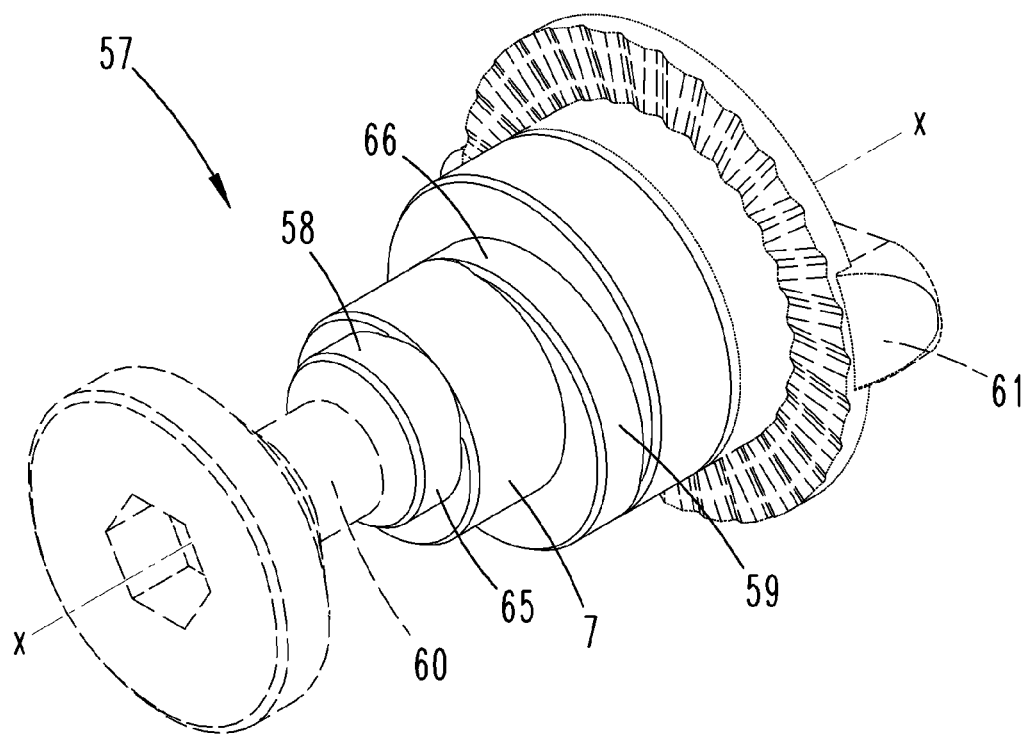
FIG. 32 a perspective view of the arrangement according to FIG. 31.

The eccentrics 58 and 59 act on the first or second axis 51, 54 of the coupling rods 50, 53 via the first and second handlebars 63, 64 (see FIGS. 30, 35 and 36).

The automatic cutting depth adjustment also given in this embodiment is calibrated by twisting the handle 61, which correspondingly leads to a rotational displacement of the eccentrics 58 and 59 via the positive connection, further correspondingly to a displacement of the control areas 65, 66 cross sectionally pre-curved in an eccentric manner relative to the geometric rotational axis x by the respective angular amount.

Figure 33:
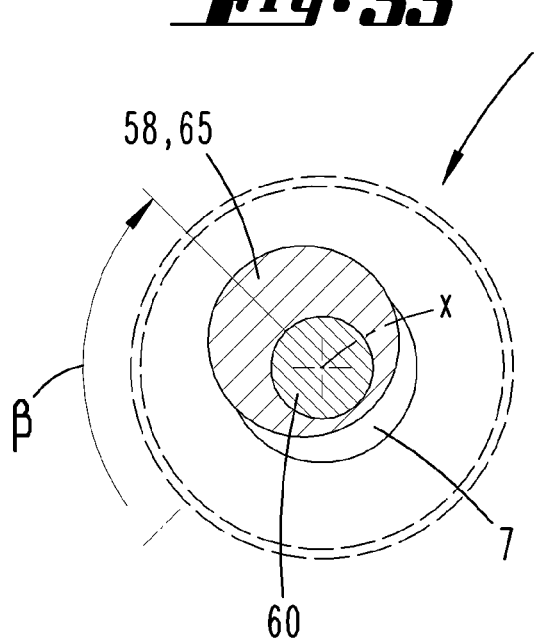
FIG. 33 the section according to line XXXIII-XXXIII on FIG. 31 through the area of the first eccentric.
Figure 34:
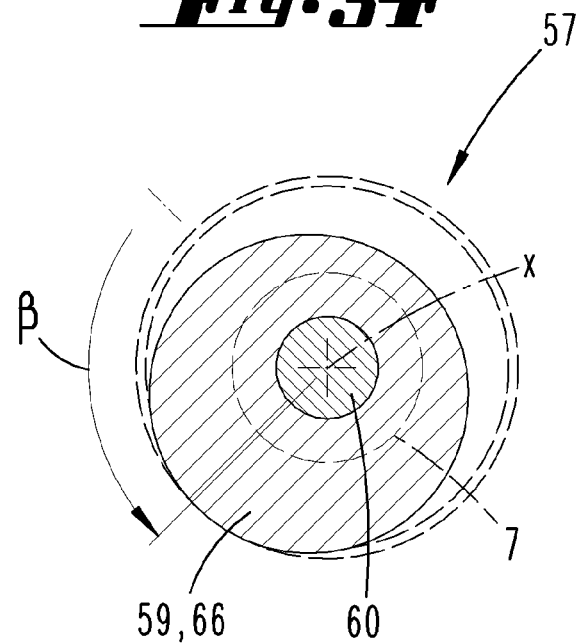
FIG. 34 the section according to line XXXIV-XXXIV on FIG. 31 through the area of the second eccentric.

As evident from the sectional views on FIGS. 33 and 34, the control areas 65 and 66 of the eccentrics 58 and 59 can be arranged offset relative to each other with respect to the geometric rotational axis x by an angle β of about 90° according to the depicted exemplary embodiment.

Twisting the handle 61 and concurrently the eccentrics 58 and 59 around the geometric rotational axis x makes it possible to achieve a uniform and co-directional displacement of the first and second axes 51, 54 of both coupling rods 50 and 53 in the allocated first and second oblong holes 52, 55 (see arrows e). FIG. 36 shows a handle position twisted relative to the position on FIG. 35 by 180°. Accordingly, the control areas 65 and 66 of the eccentrics 58 and 59 are twisted into an opposite position in relation to the geometric rotational axis x, while correspondingly entraining the allocated handlebars 63 and 64. In one possible configuration, the latter comprise the circumferential front surface of the respective eccentric.

According to the example, the axes 51 and 54 are displaced in the oblong hole 52, 55 by about half the measure of extension of the respectively allocated oblong hole 52, 55, while correspondingly taking along the coupling rods 50 and 53 fastened to the axes 51 and 54 as well as the sliding block parts 46 and 47 subsequently provided.

Given the arrangement of an adjusting means configuration designed in this way, the handle 61, and correspondingly the eccentrics 58 and 59, can be used to set the angular position of the sliding block parts 46 and and the position of the latter relative to the respective sliding block 48, 49 in relation to the basic alignment in the plier mouth open position, wherein an additional automatic adjustment to the cable thickness can take place from this basic position during the normal use of the wire stripper 1.

According to the illustrations on FIGS. 35 and 36, an exemplary adjustment of the eccentrics 58 and 59 by 180° for calibrating the automatic cutting depth setting can enlarge an opening of the cutting jaws 22 and 23 shown in these illustrations in relation to an opening angle by one fourth to one eighth, further for example by one sixth of the angular dimension.

The relative arrangement of the first and second axes 51, 54 in the allocated oblong holes 52 and 55 is here independent of a pivoting position of the clamping jaws 19, 20 or the plier jaws 2 and 3.

The wire stripper 1 can be provided with the clamping jaws 19 and 20 described in more detail below and/or cutting edges 17 described in more detail below.

The cutting edges 24, 25 of the cutting jaws 22, 23 can be fixed to the respective cutting jaw 22 or 23 by screws 67 to be operated at the front end.

For this purpose, each at least essentially plate-shaped cutting edge 24, 25 can have a borehole 68 to be passed through by the respective screw 67.

Figure 21:
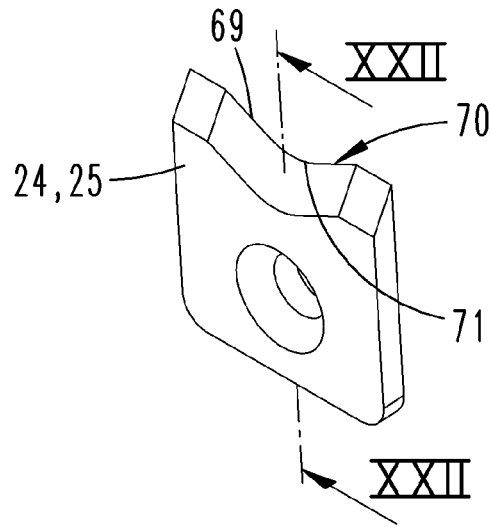
FIG. 21 a perspective, individual view of a cutting edge of a cutting jaw.
Figure 22:
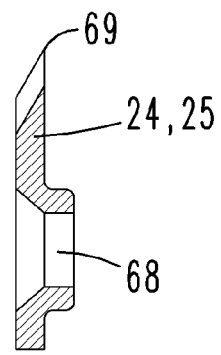
FIG. 22 the section according to line XXII-XXII on FIG. 21 through the cutting edge.
Figure 23:
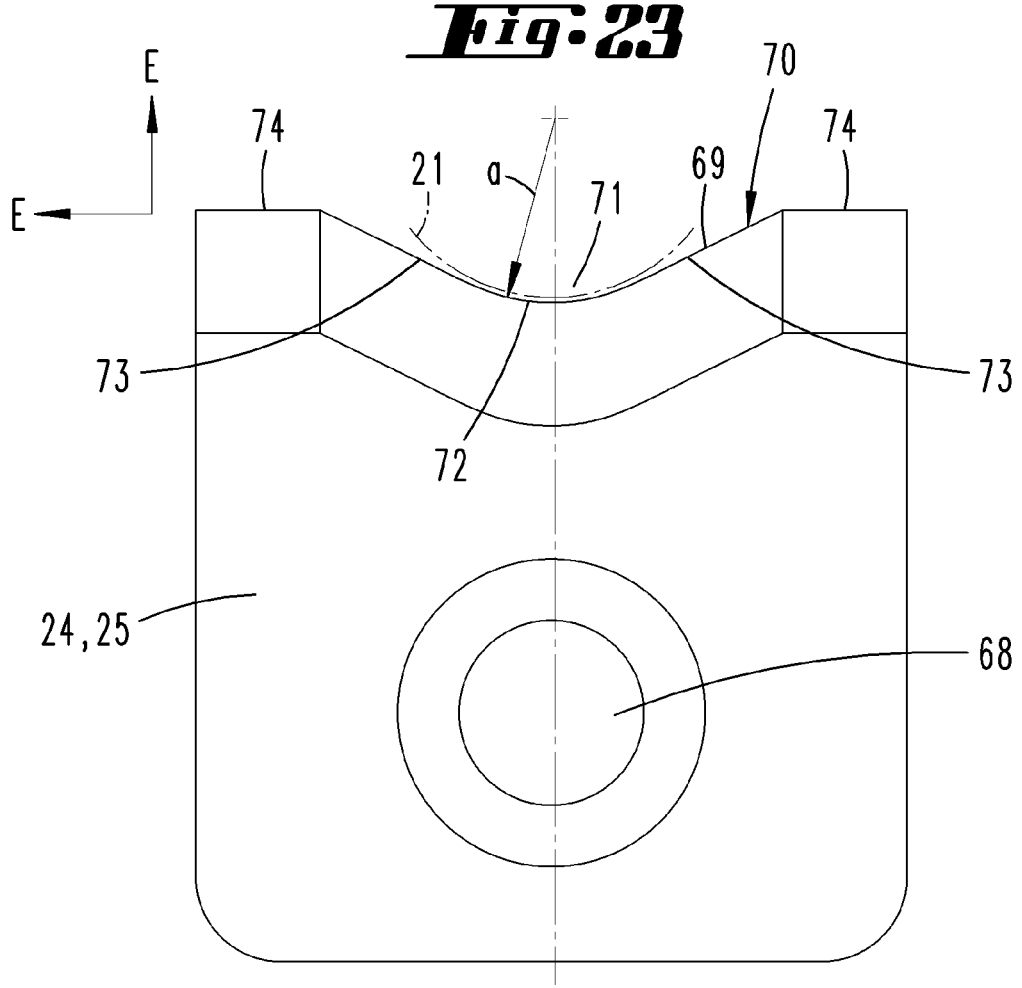
FIG. 23 a magnified side view of the cutting edge.

The cutting edge 24, 25 has a cutting tip 69 facing in the direction toward the plier mouth M in the use state, with an end that runs out at an acute angle in a cross section according to the illustrations on FIGS. 21 and 22, and forms a contour line 70 in a side view according to FIG. 23. In the side view according to FIG. 23, the contour line 70 simultaneously forms an end line of the cutting edge 17.

The contour line 70 can have a recessed portion 71. In a central region viewed in the longitudinal extension of the contour line 70, the latter resembles a continuously curved line (curved area 72), preferably a circular line, with a radius a that is adjoined preferably on both sides by a line or section 73 with less of a curvature, continuing the enclosure of an inlaid cable 21. According to the exemplary embodiment shown, this line adjoining the central, curved line can be a straight line on both sides of the curvature, thereby resulting in an essentially V-shaped recessed portion 71 of the contour line 70 as a whole, with a V-tip correspondingly rounded with the radius a.

Figure 24:
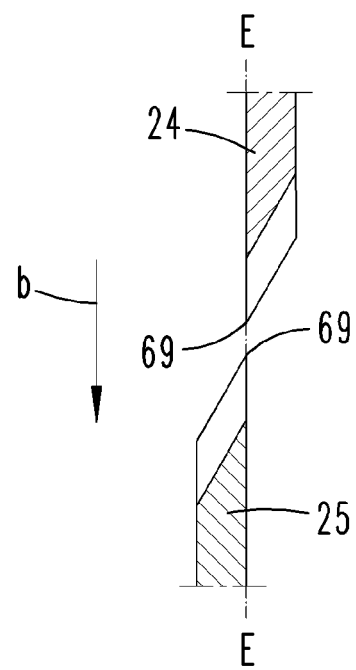
FIG. 24 a magnified, schematic sectional view of the arrangement of both cutting edges of the cutting jaw pair.
Figure 29:
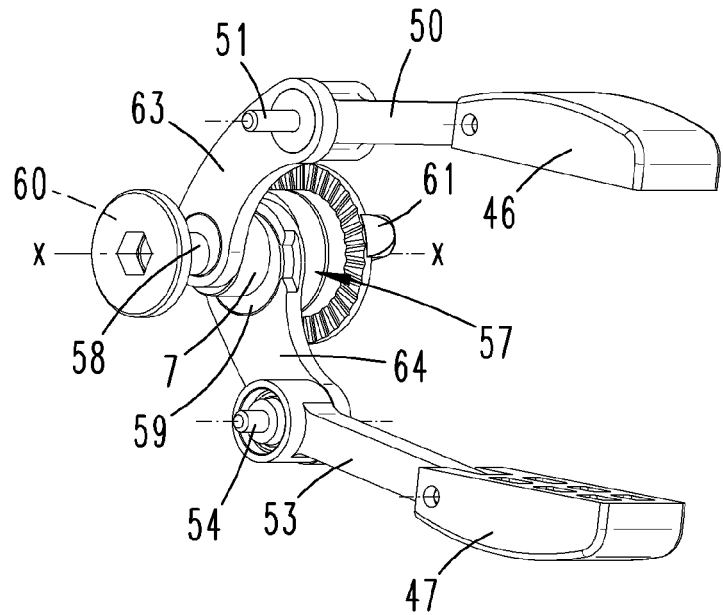
FIG. 29 a perspective view of the adjusting means arrangement for setting a cutting depth of the cutting jaws.

Relative to a cutting direction b of a cutting plane E, the contour line in section 73 that adjoins the rounded contour in area 72 can continue in the direction of the cutting direction b (see FIG. 24). In the exemplary embodiment and with reference to FIG. 29, it rises up or drops off proceeding from the recessed portion in the cutting direction b.

Bordering the recessed portion 71, the contour line 70 preferably continues on both sides of the recessed portion 71 in straight running sections 73, 74, which can run according to a shared straight line running transverse to the cutting direction b.

Figure 11:
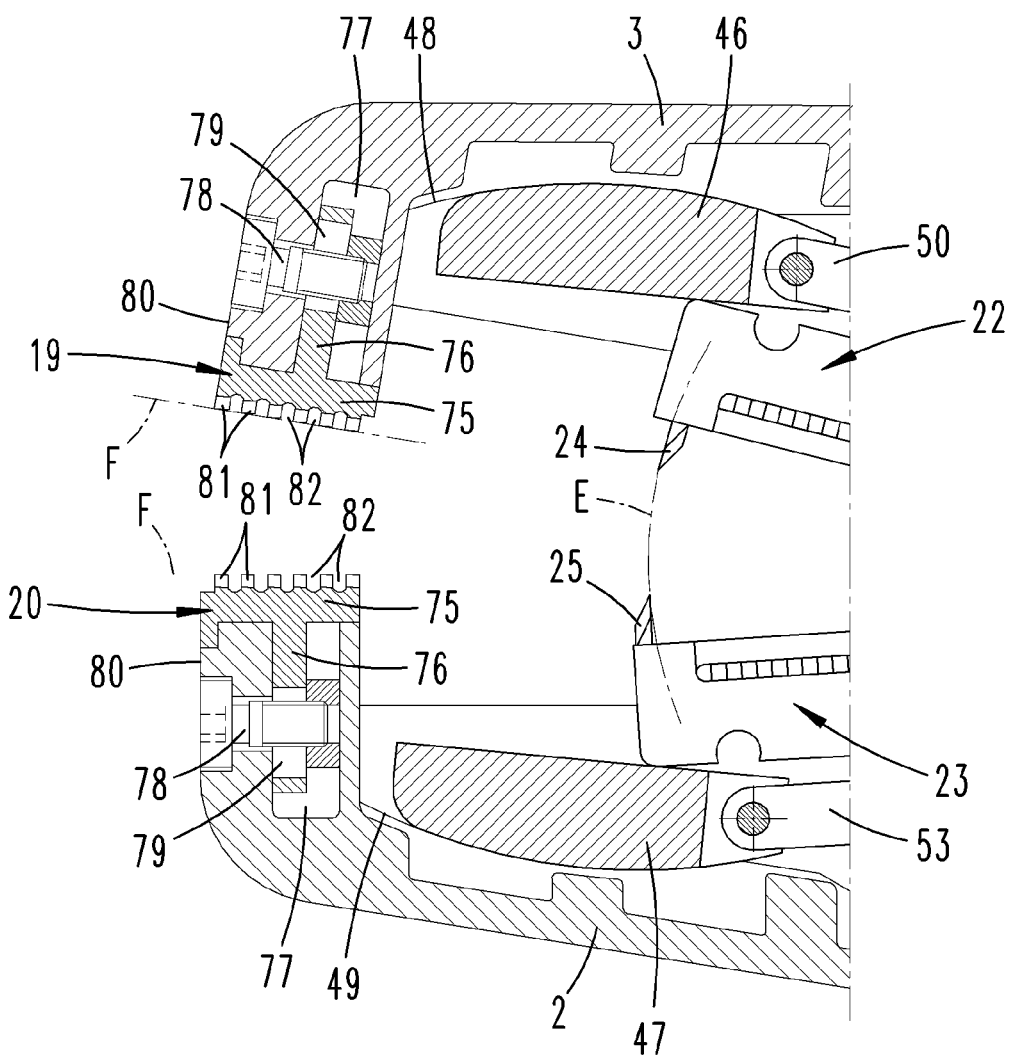
FIG. 11 a magnification of area XI on FIG. 6.

The contour line 70 here also continues in a plane extension of the cutting plane E that runs strictly curved (see FIGS. 3 and 11), see FIG. 23. The contour line 70 thus also extends in terms of width and height, namely preferably relatively less strongly in terms of height than in the area of the rounded contour, and relatively more strongly in terms of width than in the area of the rounded contour.

As illustrated, each clamping jaw 19 or 20 can initially have a plate-shaped base body 75, with two opposing broadside surfaces. Given a roughly central arrangement, a fastening extension 76 protrudes perpendicularly from the broadside surface. It can have a plate-shaped design, in the installed state with a plate plane extending transverse to an alignment of a cable 21 to be captured between the clamping jaws 19 and 20.

The fastening extension 76 makes it possible to fasten the clamping jaw 19 or 20 to the allocated plier jaw 2 or 3 by inserting the fastening extension 76 into a correspondingly designed receiving pocket 77 of the plier jaw 2, 3.

Fixation to the plier jaw 2, 3 takes place by way of a screw connection. For this purpose, the relevant fastening screw 78 passes through a corresponding borehole in the plier jaw 2, 3, as well as an oblong hole 79 in the fastening extension 76, wherein the clamping jaw 19, 20 is fastened by means of screws proceeding from a front surface 80 of the respective plier jaw 2, 3.

With respect to the broadsides of the base body 75 that face each other in the installation situation, both clamping jaws 19 and 20 are provided with ribs 81 running transverse to a cable 21 to be clamped between the clamping jaws 19 and 20. Grooved recesses 82 each having a recess floor 83 run between these ribs 81.

Figure 18:
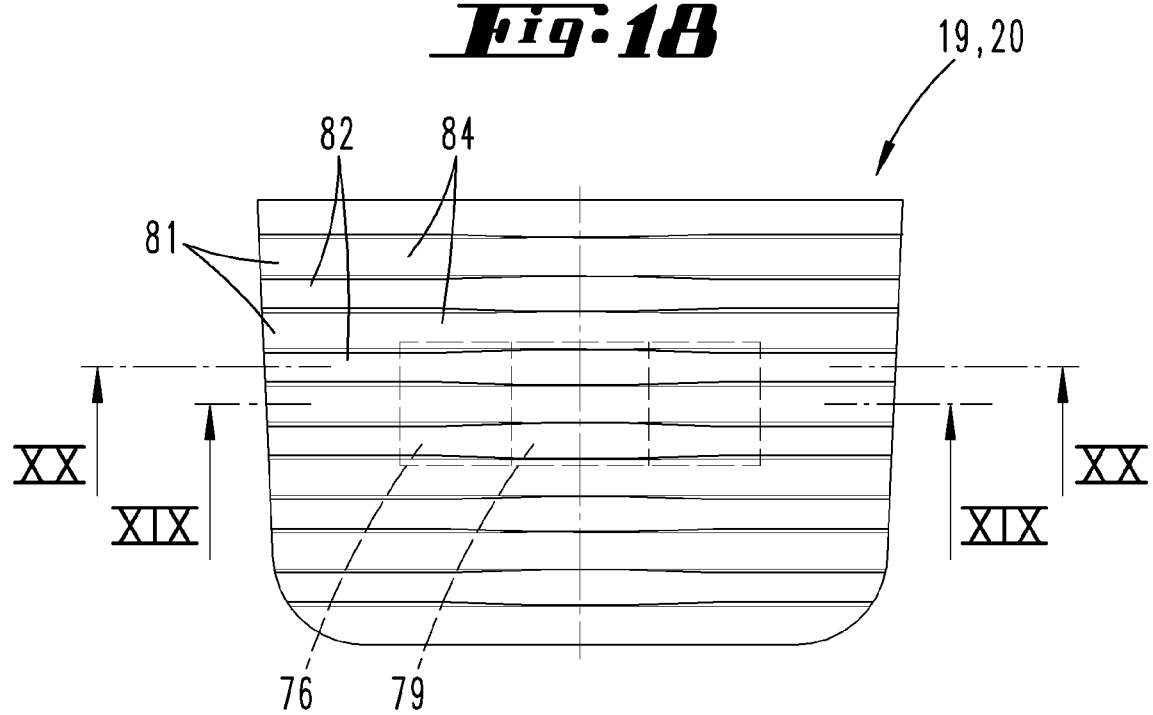
FIG. 18 the top view of the clamping jaw according to arrow XVIII on FIG. 14.

According to the depicted exemplary embodiment, each clamping jaw 19, 20 can preferably be provided with six of these ribs 81, for example, which are spaced uniformly apart from each other as viewed transverse to the longitudinal extension of the ribs 81, see also FIG. 18. The ribs 81 are further arranged in such a way that they can intermesh like a comb in the recesses 82 of the opposing clamping jaw, depending on a thickness of the cable 21 to be clamped, but also without laying in a cable 21.

As illustrated, all ribs 81 of both clamping jaws 19 and 20 can have a concave bulge 84 on a portion of their longitudinal extension, further preferably in the middle of their longitudinal extension. Given a flush arrangement of the recesses 84 as preferably viewed in a longitudinal extension of an inlaid cable and viewed over all ribs 81, this yields an essentially central, trough-shaped depression—in the sense of an enveloping surface over the contour lines of the bulges in the mentioned longitudinal extension—in relation to the rib surface 85 facing in the direction toward the plier mouth M. In this regard, reference is also made to FIGS. 19 and 20.

The rib surface 85 spans a flat clamping surface F overall on either side of the bulges 84.

The width d of a bulge 84 viewed in the extension direction of a rib 81 can correspond to about half the rib length extension measure. The depth e of a bulge 84 viewed perpendicular to the width measure d can correspond to about half the maximum, largest depth f of a recess 82 viewed in the same direction.

Figure 17:
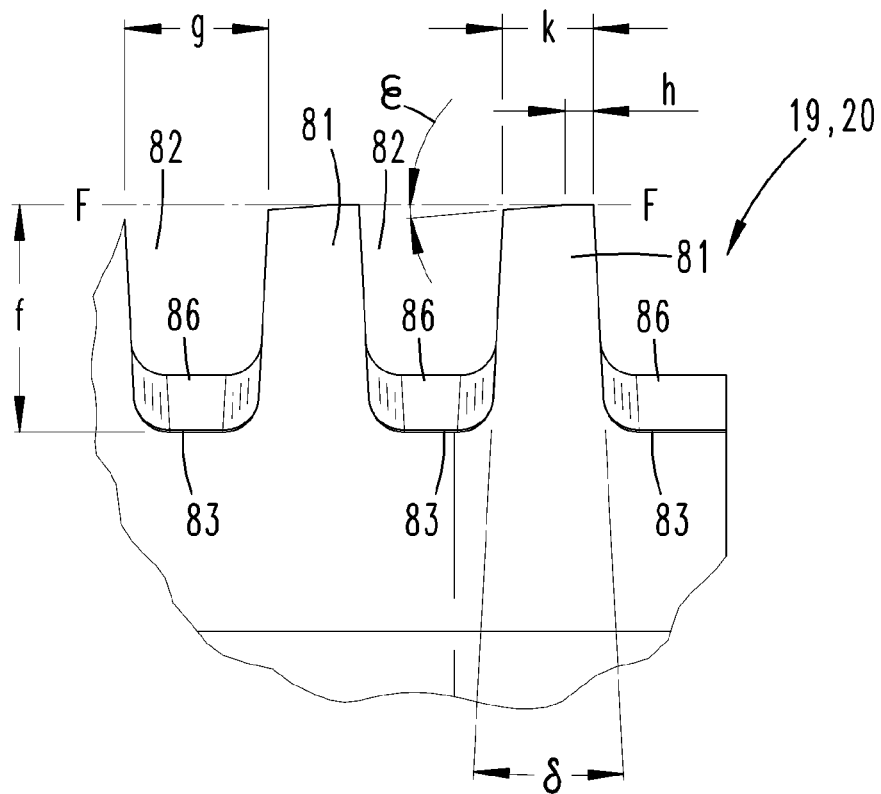
FIG. 17 a magnification of area XVII on FIG. 16.

In the depicted exemplary embodiment, the largest depth f of a recess 82 can also correspond to about 1.5 times the free distance g viewed transverse to the longitudinal rib extension between two adjacent ribs 81 in the area of their rib surface 85 (see FIG. 17).

In relation to a cross section transverse to the longitudinal extension of the rib 81, each rib 81 can additionally conically taper in the direction toward the rib surface 85 proceeding from a recess floor 83. The outer rib surfaces bordering the recess 82 can thus include a cone angle δ relative to each other of about 15°.

With reference to a longitudinal extension of the rib 81, the rib surface 85 of each rib 81 can extend transversely over a partial area in a plane defining the clamping surface F, for example as illustrated on FIG. 17 over a length h, which can correspond to about one third of the overall length k projected into the clamping surface F. According to the embodiment shown on FIG. 17, the section of the rib surface 85 extending beyond the length h can drop off at an angle ε of about 5°.

The recess floor 83 can vary in depth over the length of the recess 82, and correspondingly have varying dimensions f. As also illustrated, a dome-shaped elevation 86 can be provided in the area of the bulge 84 on the recess floor side, with a width m as viewed in the longitudinal extension of the recess 82 that can correspond to about one third of the overall length of the recess 82 or a rib 81, and a height n over the level of the area of the recess floor 83 adjoining the elevation 86, wherein the height n can correspond to about one third to one fifth of the largest depth f of the recess 82.

The arrangement and dimensions of the bulge 84 and elevation 86 can further be selected so as to prevent the bulge 84 from reaching the bulge floor 83, even in the area of the elevation 86.

The above comments serve to explain the inventions encompassed by the application as a whole, which each independently also further develop the prior art at least by the following feature combinations, wherein two, several or all of these feature combinations can also be combined, specifically:

A wire stripper, characterized in that the sliding block part 46, 47 can be set independently of a closed position of the clamping jaws 19, 20 in relation to a setting relative to the sliding block 48, 49.

A wire stripper, characterized in that one plier jaw 2 is fixed, and one plier jaw 3 is movable via a rotational movement relative to the fixed plier jaw 2.

A wire stripper, characterized in that the sliding block part 46 is movably rotatably mounted on the movable plier jaw 3 with respect to a rotational axis.

A wire stripper, characterized in that the rotational axis can be set in relation to the movable plier jaw 3 independently of a closed position of the clamping jaws 19, 20 relative to each other.

A wire stripper, characterized in that two sliding block parts 46, 47 are provided, wherein a first sliding block part 46 acts on the cutting jaw 22 allocated to the movable plier jaw 3, and a second sliding block part 47 acts on the cutting jaw 23 allocated to the fixed plier jaw 2.

A wire stripper, characterized in that the sliding block part 46 allocated to the movable plier jaw 3 is mounted in the fixed plier jaw 2 via a first axis 51 guided in a first oblong hole 52.

A wire stripper, characterized in that the sliding block part 47 allocated to the fixed plier jaw 2 is mounted in the movable plier jaw 3 via a second axis 54 guided in a second oblong hole 55.

A wire stripper, characterized in that the relative arrangement of the first and/or second axis 51, 54 in the first and/or second oblong hole 52, 55 can be set independently of a pivoting position of the clamping jaws 19, 20 relative to each other.

A wire stripper, characterized in that the adjustability can be achieved via a first and/or second eccentric 58, 59.

A wire stripper, characterized in that the first and second eccentrics 58, 59 are formed on a shared eccentric part 57 with a shared rotational axis x.

A wire stripper, characterized in that the first and/or second eccentrics 58, 59 are connected by means of a first and a second handlebar part 63, 64 with the first or second axis 51, 54.

All disclosed features (both separately and in combination) are essential to the invention. The disclosure content of the accompanying/attached priority documents (copy of the preliminary application) are hereby incorporated into the disclosure of the application in its entirety, also for the purpose of including features of these documents in claims of the present application. Even without the features of a referenced claim, the features in the subclaims characterize independent inventive further developments of prior art, in particular to generate partial applications based upon these claims. The invention indicated in each claim can additionally have one or several of the features indicated in the above specification, in particular provided with reference numbers, and/or in the reference list. The invention also relates to embodiments in which individual features mentioned in the above specification are not realized, in particular if they are obviously not required for the respectively intended use, or can be replaced by other technically equivalent means.

REFERENCE LIST

1 Wire stripper
2 Fixed plier jaw
3 Movable plier jaw
4 Fixed gripping part
5 Movable gripping part
6 Cheek area
7 Rotational axis
8 Shoulder area
9 Projecting area
10 Support surface
11 Control lever
12 Roller
13 Boom
14 Restoring spring
15 Projecting area
16 Handlebar
17 Cutting edge
18 Cleared area
19 Clamping jaw
20 Clamping jaw
21 Cable
22 Cutting jaw
23 Cutting jaw
24 Cutting edge
25 Cutting edge
26 Cutting jaw pair
27 Pivot axis
28 Spring
29 Stop carriage
30 Pull rod
31 Recess
32 Insertion opening
33 Tensile axis
34 Oblong hole
35 Sleeve
36 Mounting part
37 Sleeve wall
38 Oblong hole
39 Spring
40 Floor
41 Shoulder
42 Cavity
43 Cavity floor
44 Latching projection
45 Latching recess
46 Sliding block part
47 Sliding block part
48 Sliding block
49 Sliding block
50 Coupling rod
51 First axis
52 First oblong hole
53 Coupling rod
54 Second axis
55 Second oblong hole
56 Insulating section
57 Eccentric part
58 First eccentric
59 Second eccentric
60 Threaded bolt
61 Handle
62 Recess
63 First handlebar
64 Second handlebar
65 Control area
66 Control area
67 Screw
68 Borehole
69 Cutting tip
70 Contour line
71 Recessed portion
72 Curved area
73 Section
74 Section axis
75 Base body
76 Fastening extension
77 Receiving pocket
78 Fastening screw
79 Oblong hole
80 Front surface
81 Rib
82 Recess
83 Recess floor
84 Bulge
85 Rib surface
86 Elevation
a Radius
b Cutting direction
c Arrow
d Width
e Depth
f Depth
g Distance
h Length
k Overall length
m Width
n Height
r Displacement direction
x Geometric rotational
y Geometric axis
z Geometric axis
E Cutting plane
F Clamping surface
M Plier mouth
α Angle
β Angle
Y Opening angle
δ Cone angle
ε Angle

The invention claimed is:
1. A wire stripper for stripping cables, comprising:
a fixed plier jaw having a fixed gripping part, a movable plier jaw rotatably connected to the fixed plier jaw, and a movable gripping part configured for moving the movable plier jaw,
two outer clamping jaws, one of said outer clamping jaws being disposed on the fixed plier jaw and the other of said outer clamping jaws being disposed on the movable plier jaw,
two inner cutting jaws, one of said inner cutting jaws engaging the fixed plier jaw and the other of said cutting jaws engaging the movable plier jaw, a pull rod held captive within the fixed plier jaw and being connected to each of the two cutting jaws, and being actuatable by moving the movable gripping part toward the fixed gripping part, wherein moving the movable gripping part toward the fixed gripping part causes the movable plier jaw to move toward the fixed plier jaw and causes the clamping jaws to move toward each other and the inner cutting jaws to move toward each other, a sliding block fixed in each of the fixed plier jaw and movable plier jaw, each of the sliding blocks accommodating a sliding block part that is slidably movable along a respective one of the sliding blocks, wherein the sliding block parts are each connected via separate coupling rods to an adjustment part received in the fixed plier jaw, wherein the cutting jaws, once being moved relative to each other are configured to be automatically linearly displaced from an extended starting position into a retracted end position by actuation of the pull rod, which moves the cutting jaws in a displacement direction (r) along the sliding block parts, wherein the adjustment part is configured to manually adjust the cutting position of the cutting jaws independently of a closing position of the fixed plier jaw and movable plier jaw, such that manual actuation of the adjustment part adjusts a displacement of the sliding block parts along the sliding blocks in the displacement direction, so that a supporting point for guiding the cutting jaws on the sliding block parts may vary independently of the closing position of the fixed plier jaw and movable plier jaw in order to accommodate different thicknesses of insulation of the cables, and the sliding block parts are displaced in an equal amount in or opposite the displacement direction (r) via the coupling rods.

2. The wire stripper according to claim 1, wherein the adjustment part is an axle mounted as a rotational axis and an eccentric mounted on the axle.

3. The wire stripper according to claim 1, wherein the coupling rod of the sliding block part allocated to the movable plier jaw is mounted in the fixed plier jaw by way of a first axle guided in a first oblong hole disposed in the fixed plier jaw.

4. The wire stripper according to claim 3, wherein the coupling rod of the sliding block part allocated to the fixed plier jaw is mounted in the movable plier jaw by way of a second axle guided in a second oblong hole disposed in the movable plier jaw.

5. The wire stripper according to claim 4, wherein a position of the first axle in the first oblong hole and/or the second axle in the second oblong hole is manually adjustable independently of the closing position of the clamping jaws.

6. The wire stripper according to claim 5, further comprising a first eccentric and a second eccentric that are movable around a single geometrical rotational axis and being mounted in the fixed plier jaw, wherein the first eccentric is connected with a first one of the coupling rods, and the second eccentric is connected with a second one of the coupling rods, and wherein the adjustment of the position of the first and/or second sliding block parts can be achieved by way of changing a position of the first and/or second eccentric.

7. The wire stripper according to claim 6, wherein the first and second eccentrics are formed on a single eccentric part that is rotatable about the single geometrical rotational axis (x).

8. The wire stripper according to claim 6, wherein the first eccentric is connected with the first coupling rod by a first handlebar part, and the second eccentric is connected with the second coupling rod by a second handlebar part.

* * * * *